US012734765B2

(12) United States Patent
Aratani et al.

(10) Patent No.: US 12,734,765 B2
(45) Date of Patent: Sep. 15, 2026

(54) CONTINUOUS-FIBER-REINFORCED RESIN MOLDING AND METHOD FOR MANUFACTURING SAME

(71) Applicant: Asahi Kasei Kabushiki Kaisha, Tokyo (JP)

(72) Inventors: Yusuke Aratani, Tokyo (JP); Tsutomu Akiyama, Tokyo (JP); Toru Koizumi, Tokyo (JP)

(73) Assignee: Asahi Kasei Kabushiki Kaisha, Tokyo (JP)

(*) Notice: Subject to any disclaimer, the term of this patent is extended or adjusted under 35 U.S.C. 154(b) by 184 days.

(21) Appl. No.: 18/812,368

(22) Filed: Aug. 22, 2024

(65) Prior Publication Data

US 2025/0018661 A1 Jan. 16, 2025

Related U.S. Application Data

(62) Division of application No. 16/970,904, filed as application No. PCT/JP2019/017285 on Apr. 23, 2019, now abandoned.

(30) Foreign Application Priority Data

Apr. 25, 2018 (JP) ................................ 2018-083938
Apr. 25, 2018 (JP) ................................ 2018-083949

(Continued)

(51) Int. Cl.
*B29C 70/16* (2006.01)
*B29C 70/40* (2006.01)

(Continued)

(52) U.S. Cl.
CPC .............. *B29C 70/16* (2013.01); *B29C 70/40* (2013.01); *B29C 70/42* (2013.01); *C08J 5/04* (2013.01);

(Continued)

(58) Field of Classification Search
None
See application file for complete search history.

(56) References Cited

U.S. PATENT DOCUMENTS 3,997,306 A * 12/1976 Hedden .................. C03C 25/26 65/448
4,049,865 A * 9/1977 Maaghul .................. C08J 5/08 428/375

(Continued)

FOREIGN PATENT DOCUMENTS

CN 1058618 A 2/1992
CN 1127806 A 7/1996

(Continued)

OTHER PUBLICATIONS

International Search Report issued in corresponding International Patent Application No. PCT/JP2019/017285 dated Aug. 6, 2019.

(Continued)

*Primary Examiner* — Jeffrey A Vonch
(74) *Attorney, Agent, or Firm* — Morgan, Lewis & Bockius LLP

(57) ABSTRACT

Provided are a continuous fiber-reinforced resin molding having high adhesion and compatibility in an interface between continuous reinforcing fibers and a synthetic resin, and in which a low occurrence of voids in the interface and adequate strength can be realized, and a method for manufacturing the same. A continuous fiber-reinforced resin molding comprising a synthetic resin and continuous reinforcing fibers having a substantially circular cross section, the continuous fiber-reinforced molding being characterized in that the number of continuous reinforcing fibers where the porosity in a peripheral-edge region separated by one tenth the radius of a single continuous reinforcing fiber from the peripheral edge part of the continuous reinforcing fibers in the interface between the synthetic resin and the single (Continued)

continuous reinforcing fiber in a cross section orthogonal to the length direction of the continuous reinforcing fibers is at least 10% of the total number of continuous reinforcing fibers.

1 Claim, 6 Drawing Sheets

(30) Foreign Application Priority Data

Jul. 25, 2018 (JP) ................................ 2018-139322
Jul. 25, 2018 (JP) ................................ 2018-139342
Jul. 25, 2018 (JP) ................................ 2018-139396
Nov. 30, 2018 (JP) ................................ 2018-225610

(51) Int. Cl.

*B29C 70/42* (2006.01)
*C08J 5/04* (2006.01)
*C08J 5/08* (2006.01)
*B29C 43/52* (2006.01)
*B29C 70/20* (2006.01)
*B29C 70/22* (2006.01)
*B29K 77/00* (2006.01)
*B29K 101/12* (2006.01)
*B29K 105/00* (2006.01)
*B29K 105/08* (2006.01)
*B29K 309/08* (2006.01)
*B29L 31/34* (2006.01)
*C08K 7/14* (2006.01)

(52) U.S. Cl.

CPC ................ *C08J 5/08* (2013.01); *B29C 43/52* (2013.01); *B29C 70/20* (2013.01); *B29C 70/22* (2013.01); *B29K 2077/00* (2013.01); *B29K 2101/12* (2013.01); *B29K 2105/0005* (2013.01); *B29K 2105/0872* (2013.01); *B29K 2309/08* (2013.01); *B29K 2313/02* (2013.01); *B29L 2031/3481* (2013.01); *B32B 2255/02* (2013.01); *B32B 2255/24* (2013.01); *B32B 2255/26* (2013.01); *B32B 2260/02* (2013.01); *B32B 2260/046* (2013.01); *B32B 2262/101* (2013.01); *B32B 2377/00* (2013.01); *B32B 2398/20* (2013.01); *C08J 5/043* (2013.01); *C08J 2377/00* (2013.01); *C08J 2377/06* (2013.01); *C08J 2477/00* (2013.01); *C08K 7/14* (2013.01); *Y10T 428/249944* (2015.04); *Y10T 428/249946* (2015.04); *Y10T 442/2098* (2015.04); *Y10T 442/2402* (2015.04); *Y10T 442/2992* (2015.04)

(56) References Cited

U.S. PATENT DOCUMENTS 4,295,871 A * 10/1981 Droux ..................... C08J 5/248 427/178
4,390,647 A * 6/1983 Girgis ..................... C08K 9/04 106/272
4,487,797 A * 12/1984 Watson ..................... C08J 5/08 156/181
4,549,920 A * 10/1985 Cogswell ............. B29C 70/521 156/181
4,894,105 A * 1/1990 Dyksterhouse .......... C08J 5/249 156/181
4,919,739 A * 4/1990 Dyksterhouse .......... C08J 5/243 427/195
4,937,028 A * 6/1990 Glemet ............... B29C 48/0016 264/171.23
4,943,472 A * 7/1990 Dyksterhouse ......... B29B 15/12 428/113
4,997,693 A * 3/1991 Sonoh ..................... B29C 70/20 428/221
5,066,361 A * 11/1991 Scharf ..................... C03C 25/40 216/99
5,128,198 A * 7/1992 Dyksterhouse ......... B29C 70/54 428/338
5,151,322 A * 9/1992 Kimoto .................. B29C 70/14 428/408
5,171,630 A * 12/1992 Muzzy ................... B29C 70/50 428/408
5,240,974 A * 8/1993 Lechner ..................... C08J 5/08 523/213
5,262,469 A * 11/1993 Osafune ................. B29C 70/50 523/217
5,316,834 A * 5/1994 Matsuda ................ B32B 5/024 442/247
5,492,755 A * 2/1996 Binse ................... B29C 70/521 442/178
5,605,757 A * 2/1997 Klett ...................... C03C 25/36 525/29
5,658,510 A 8/1997 Carraro et al.
5,780,366 A * 7/1998 Appelt ................... B32B 15/14 428/374
5,789,074 A * 8/1998 Moireau ................... C08J 5/08 428/221
5,932,335 A * 8/1999 Keller ....................... C08J 5/06 427/407.1
6,264,746 B1 7/2001 Peng
6,423,407 B1 7/2002 Abe et al.
6,455,143 B1 9/2002 Ishibashi et al.
10,836,136 B2 * 11/2020 Berlin .................. B29C 65/524
2002/0094428 A1 7/2002 Nomura et al.
2002/0198301 A1 * 12/2002 Campbell ................. C08J 5/06 524/300
2003/0054150 A1 * 3/2003 Evans ...................... B32B 5/28 428/297.4
2005/0014906 A1 1/2005 Niino
2005/0163998 A1 * 7/2005 Kashikar ................. C08J 5/043 428/375
2006/0078721 A1 * 4/2006 Rau ........................ C03C 25/26 428/300.1
2007/0148429 A1 * 6/2007 McGrath ................ B29C 48/21 428/292.1
2008/0241533 A1 * 10/2008 Dijt ...................... C03C 25/285 524/502
2009/0062452 A1 * 3/2009 Harder .................. C08G 69/36 264/165
2009/0075078 A1 3/2009 Yano et al.
2009/0143524 A1 6/2009 Nakayama et al.
2010/0068518 A1 * 3/2010 Honma .................... B29B 7/90 428/401
2010/0286343 A1 * 11/2010 Burghardt ................. C08J 5/08 526/348
2011/0021737 A1 * 1/2011 Tadepalli .............. C08G 69/48 264/258
2011/0045275 A1 * 2/2011 Tadepalli .................. C08J 5/08 428/300.1
2012/0015186 A1 * 1/2012 Honma .................. C08L 23/10 428/375
2012/0028047 A1 * 2/2012 Imai ........................ C08J 5/243 524/508
2012/0107509 A1 * 5/2012 Scherzer .............. B29C 67/246 427/388.1
2012/0108131 A1 * 5/2012 Elia ........................ B32B 27/12 428/435
2012/0178329 A1 7/2012 Kochi et al.
2012/0321829 A1 * 12/2012 Bayer ..................... C08K 7/14 524/400
2012/0328858 A1 12/2012 Fujiwara et al.
2013/0059496 A1 * 3/2013 Ardiff ...................... B32B 5/26 442/187
2013/0161859 A1 * 6/2013 Shooshtari ........... B29C 53/845 427/221

(56) References Cited

U.S. PATENT DOCUMENTS

2013/0164449 A1* 6/2013 Tadepalli ................ B29C 70/04 427/322
2013/0165548 A1* 6/2013 Tadepalli ............. C09D 177/02 252/182.13
2013/0192434 A1 8/2013 Hashimoto et al.
2013/0224470 A1* 8/2013 Vautard .................. C08L 63/10 428/300.1
2014/0077412 A1 3/2014 Taniguchi et al.
2014/0255631 A1* 9/2014 Piret .......................... C08J 5/08 523/427
2014/0256201 A1* 9/2014 Zhang ..................... B29C 45/02 156/169
2014/0288220 A1* 9/2014 Duncan .................... C08K 5/20 524/133
2014/0316063 A1* 10/2014 Hochstetter .............. C08J 5/246 264/482
2014/0356612 A1 12/2014 Sano et al.
2014/0370266 A1* 12/2014 Masson .................... C08K 7/14 428/300.1
2015/0011707 A1* 1/2015 Gleich .................. B29C 70/521 524/879
2015/0017853 A1* 1/2015 Perillat-Collomb ......................... B29C 70/542 428/221
2015/0051313 A1* 2/2015 Van Hoof ............... C08L 67/02 523/439
2015/0148485 A1* 5/2015 Yohannes ............. B29C 43/003 524/879
2015/0175803 A1* 6/2015 Stoppelmann ........... C08K 3/22 428/35.7
2015/0267050 A1* 9/2015 Briffaud ..................... C08J 5/04 524/538
2015/0336369 A1* 11/2015 Bae ..................... B32B 38/1808 156/179
2016/0009881 A1 1/2016 Fujita et al.
2016/0090685 A1* 3/2016 Sauer .................... B29B 15/125 428/221
2016/0297105 A1* 10/2016 Moireau ............. B29C 35/0805
2016/0298242 A1* 10/2016 Morimoto ............... B32B 15/14
2016/0347009 A1* 12/2016 Gaillard ................ B29B 15/125
2017/0022349 A1* 1/2017 Mii .......................... C08K 9/08
2017/0066200 A1* 3/2017 Zhang ...................... C08J 5/043
2017/0072596 A1* 3/2017 Oguni ..................... C08L 51/06
2017/0165875 A1* 6/2017 Gaillard ................ B29B 15/122
2017/0217140 A1* 8/2017 Han .......................... B32B 5/24
2017/0291375 A1* 10/2017 Hartman ............... B29C 70/504
2017/0362401 A1 12/2017 Seidel et al.
2018/0043580 A1* 2/2018 Prins ....................... B29C 70/20
2018/0126674 A1 5/2018 Ohtani et al.
2018/0229399 A1* 8/2018 Zhang ........................ B05C 9/10
2018/0244879 A1 8/2018 Takehara et al.
2018/0273709 A1* 9/2018 Seo ........................ B29B 15/14
2018/0290339 A1* 10/2018 Nguyen .................. B32B 27/34
2018/0313027 A1* 11/2018 Horimoto ............. D06M 10/02
2018/0326627 A1 11/2018 Ichiki et al.
2019/0071549 A1 3/2019 Koshi et al.
2019/0118495 A1* 4/2019 Miyao ................... B29C 70/504
2019/0160762 A1 5/2019 Ono et al.
2019/0299495 A1* 10/2019 Fujioka ................... B29C 43/52
2019/0299545 A1* 10/2019 Zhang ...................... C08J 5/042
2019/0299546 A1* 10/2019 Zhang ................... B29B 15/127
2020/0010632 A1* 1/2020 Watari .................... B32B 5/024
2020/0139586 A1* 5/2020 Hochstetter .............. C08J 5/043

FOREIGN PATENT DOCUMENTS

CN 1154423 A 7/1997
CN 1331763 A 1/2002
CN 1610778 A 4/2005
CN 1827671 A * 9/2006
CN 101056898 A 10/2007
CN 101305055 A 11/2008
CN 101474868 A 7/2009
CN 102218829 A * 10/2011
CN 102367003 A * 3/2012
CN 102367004 A * 3/2012
CN 102498173 A 6/2012
CN 102834440 A 12/2012
CN 103119209 A 5/2013
CN 103171154 A 6/2013
CN 103554906 A * 2/2014 ................ C08J 5/10
CN 103571046 A * 2/2014 .............. C08J 5/043
CN 103582556 A 2/2014
CN 104045244 A * 9/2014
CN 104387670 A * 3/2015 ............... C08K 9/10
CN 104513480 A * 4/2015 .............. C08L 77/02
CN 104562692 A * 4/2015
CN 104822741 A 8/2015
CN 105623250 A * 6/2016 .............. C08L 77/02
CN 106313496 A 1/2017
CN 107385594 A 11/2017
CN 107406599 A 11/2017
CN 107921726 A 4/2018
CN 108779271 A 11/2018
DE 2449549 A1 4/1975
DE 3840374 A1 * 5/1990 ............... C08K 5/20
DE 102010040027 A1 * 3/2012 ................ C08J 5/04
DE 102010056239 A1 * 4/2012 ........... B29C 70/865
EP 0338128 A2 * 10/1989 ............. C08G 61/08
EP 2377675 A1 10/2011
EP 2910596 A1 8/2015
EP 3023241 A1 5/2016
GB 1373782 A * 11/1974 ............... B32B 5/02
GB 1477642 A 6/1977
GB 2114055 A * 8/1983 ........... B29C 70/467
JP S63-227864 A 9/1988
JP S63-227865 A 9/1988
JP S63-227873 A 9/1988
JP H0232843 A * 2/1990
JP H02-155634 A 6/1990
JP H02-214639 A 8/1990
JP H03114819 A * 5/1991
JP H03-236942 A 10/1991
JP H04-185313 A 7/1992
JP H05-311069 A 11/1993
JP H06126847 A * 5/1994
JP H06206223 A * 7/1994
JP H0724830 A * 1/1995
JP H10-138379 A 5/1998
JP H11-042693 A 2/1999
JP 2000254977 A * 9/2000
JP 2002-088259 A 3/2002
JP 2002-275283 A 9/2002
JP 2003-238213 A 8/2003
JP 2004-059872 A 2/2004
JP 2005-262818 A 9/2005
JP 2006-117839 A 5/2006
JP 2006-321896 A 11/2006
JP 2008-034823 A 2/2008
JP 2009-019202 A 1/2009
JP 2011214175 A * 10/2011
JP 2013-159675 A 8/2013
JP 2013-166924 A 8/2013
JP 2013253196 A * 12/2013
JP 2014-502222 A 1/2014
JP 2015-030119 A 2/2015
JP 5878544 B2 3/2016
JP 5987335 B2 9/2016
JP 2016-196624 A 11/2016
JP 2017-179205 A 10/2017
JP 2017-190439 A 10/2017
JP 2017-530229 A 10/2017
JP 2017-222859 A 12/2017
KR 20160062871 A * 6/2016 ............. C08L 25/12
TW 201938350 A 10/2019
WO WO-8102742 A * 10/1981
WO WO-8800527 A * 1/1988
WO 92/00182 A1 1/1992
WO 98/34979 A1 8/1998
WO WO-9946334 A1 * 9/1999 ................ C08J 5/18
WO 00/51807 A1 9/2000
WO 2005/073306 A1 8/2005

(56) References Cited

FOREIGN PATENT DOCUMENTS

| | | | | |
|---|---|---|---|---|
| WO | 2012/058345 A1 | | 5/2012 | |
| WO | 2012/058352 A1 | | 5/2012 | |
| WO | 2012/058368 A1 | | 5/2012 | |
| WO | WO-2012058379 A2 | * | 5/2012 | ............... B32B 5/26 |
| WO | WO-2014075188 A1 | * | 5/2014 | ............... B32B 1/08 |
| WO | WO-2015046290 A1 | * | 4/2015 | ............. B29C 70/20 |
| WO | 2016/048454 A1 | | 3/2016 | |
| WO | 2017/026250 A1 | | 2/2017 | |

OTHER PUBLICATIONS

International Preliminary Report on Patentability and Written Opinion issued in corresponding International Patent Application No. PCT/JP2019/017285 dated Nov. 5, 2020.
Supplementary European Search Report issued in corresponding European Patent Application No. 19764162.4 dated Jul. 22, 2021.
Supplementary Partial European Search Report issued in corresponding European Patent Application No. 19793719.6 dated Sep. 2, 2021.

* cited by examiner

CONTINUOUS-FIBER-REINFORCED RESIN MOLDING AND METHOD FOR MANUFACTURING SAME

FIELD

The present invention relates to a continuous fiber-reinforced molded resin and to a method for its production. More specifically, the invention relates to a continuous fiber-reinforced molded resin having high adhesive force and affinity at the interface between the continuous reinforcing fibers and the synthetic resin, having small voids in the interface and exhibiting adequate strength, to a continuous fiber-reinforced molded resin with a sufficiently small loss tangent of the continuous fiber-reinforced molded resin and capable of exhibiting sufficient shock absorption, to a continuous fiber-reinforced molded resin with a sufficiently large storage modulus of the continuous fiber-reinforced molded resin and capable of exhibiting sufficient impact strength, and to a continuous fiber-reinforced molded resin having a high resin impregnating property and high strength and rigidity, as well as to a method for producing the same.

BACKGROUND

Molded composite materials having a reinforcing material such as glass fibers added to a matrix resin material, have been used in structural parts of various machines and vehicles, or in pressure vessels or tubular structures. In a continuous fiber-reinforced molded resin it is preferred for the reinforcing fibers to be continuous fibers from the viewpoint of strength, and for the resin to be a thermoplastic resin from the viewpoint of the molding cycle and recycling properties. The continuous fiber-reinforced molded resins that have previously been proposed include those with a modified sizing agent added to reinforcing fibers (see PTL 1, for example), those with a modified difference between the melting temperature (melting point) and crystallization temperature of the thermoplastic resin (see PTL 2, for example), those with an organic salt added to a resin material (see PTL 3, for example), those with a molding precursor fabric layered with a thermoplastic resin (see PTL 4, for example), those with reinforcing fibers pre-impregnated with a low-melting-point thermoplastic resin to increase the impregnating property (see PTL 5, for example), and those using two or more resins with different melting points as the surface resins to impart satisfactory resistance against interlayer separation (see PTL 6, for example).

CITATION LIST

Patent Literature

[PTL 1] Japanese Unexamined Patent Publication No. 2003-238213

[PTL 2] Japanese Patent Publication No. 5987335

[PTL 3] Japanese Unexamined Patent Publication No. 2017-222859

[PTL 4] Japanese Unexamined Patent Publication No. 2009-19202

[PTL 5] Japanese Unexamined Patent Publication HEI No. 10-138379

[PTL 6] Japanese Patent Publication No. 5878544

SUMMARY

Technical Problem

As a result of ardent research, the present inventors have found that continuous fiber-reinforced molded resins of the prior art all have low adhesive force and affinity at the boundaries between the continuous reinforcing fibers, such as glass fibers, and the matrix resin, and consequently have many voids and fail to exhibit sufficient strength in the interface regions between the fibers and resin, so that they do not exhibit the performance required for use in locations where high strength is necessary. Moreover, it has been found that continuous fiber-reinforced molded resins of the prior art all have high loss tangents and therefore fail to exhibit sufficient shock absorption and lack performance required for use in locations where high shock absorption is necessary, that they have low storage moduli and thus fail to exhibit sufficient impact strength and lack performance required for use in locations where high impact strength is necessary, and also that the property of resin impregnation into the continuous reinforcing fibers is low, the adhesion between the resin and continuous reinforcing fibers is inadequate, and the physical properties such as strength and rigidity, as well as productivity, are poor.

Considering the technical level of the prior art, it is an object of the present invention to provide a continuous fiber-reinforced molded resin having high adhesive force and affinity at the interface between the continuous reinforcing fibers and the synthetic resin, having small voids in the interface and exhibiting adequate strength, a continuous fiber-reinforced molded resin with a small loss tangent and capable of exhibiting sufficient impact strength, a continuous fiber-reinforced molded resin having a high storage modulus and capable of exhibiting sufficient impact strength, and a continuous fiber-reinforced molded resin having a high resin impregnating property and high strength and rigidity, as well as a method for producing the same.

Solution to Problem

As a result of accumulated research on the object stated above, the present inventors have completed this invention upon the unexpected finding that modifying the compatibility between the resin and the sizing agent that is coated during production of continuous reinforcing fibers, and the scalability during molding and of flow of the resin, can drastically reduce voids at the interface between the continuous reinforcing fibers and synthetic resin, so that press molding thereof allows production of a continuous fiber-reinforced molded resin having high strength and rigidity, while also lowering the loss tangent of the continuous fiber-reinforced molded resin so that press molding thereof allows production of a continuous fiber-reinforced molded resin having high shock absorption, and increasing the storage modulus of the continuous fiber-reinforced molded resin so that press molding thereof allows production of a continuous fiber-reinforced molded resin having high impact strength, and further that in a continuous fiber-reinforced molded resin having two or more thermoplastic resins, if the proportion of each resin at the interface regions between the continuous reinforcing fibers and resin is different than the proportion of each resin in the other resin regions, then the continuous fiber-reinforced molded resin exhibits high strength and rigidity.

Specifically, the present invention provides the following.

[1] A continuous fiber-reinforced molded resin comprising continuous reinforcing fibers with approximately circular cross-sections and a synthetic resin, wherein at the interface between each single continuous reinforcing fiber and the synthetic resin in a cross-section perpendicular to the lengthwise direction of the continuous reinforcing fiber, the number of continuous reinforcing fibers in which the void percentage within the region of the outer peripheral edge separated from the perimeter of the continuous reinforcing fiber by 1/10 of the radius of a single continuous reinforcing fiber is 10% or lower, is at least 10% of the total number of continuous reinforcing fibers.

[2] The continuous fiber-reinforced molded resin according to [1] above, wherein the number of continuous reinforcing fibers in which the void percentage is 10% or lower is at least 90% of the total number of continuous reinforcing fibers.

[3] The continuous fiber-reinforced molded resin according to [2] above, wherein the number of continuous reinforcing fibers in which the void percentage is 1% or lower is at least 90% of the total number of continuous reinforcing fibers.

[4] The continuous fiber-reinforced molded resin according to any one of [1] to [3] above, wherein the synthetic resin impregnation rate in the continuous fiber-reinforced molded resin is 99% or higher.

[5] The continuous fiber-reinforced molded resin according to any one of [1] to [4] above, wherein the continuous reinforcing fibers are glass fibers, and the tensile stress of the continuous fiber-reinforced molded resin is 480 MPa or higher.

[6] The continuous fiber-reinforced molded resin according to any one of [1] to [5] above, wherein the continuous reinforcing fibers are glass fibers, and the flexural modulus of the continuous fiber-reinforced molded resin is 22 GPa or greater.

[7] A continuous fiber-reinforced molded resin comprising a thermoplastic resin and continuous reinforcing fibers, and having a loss tangent of 0.11 or lower in twisting mode.

[8] The continuous fiber-reinforced molded resin according to [7] above, wherein the peak of the loss tangent is 78° C. or higher.

[9] A continuous fiber-reinforced molded resin comprising continuous reinforcing fibers and a thermoplastic resin, and having a storage modulus of 3.4 GPa or greater in twisting mode.

[10] The continuous fiber-reinforced molded resin according to [9] above, which when cut in a diagonal direction has a storage modulus of at least 1.5 times the storage modulus when cut in a straight direction.

[11] The continuous fiber-reinforced molded resin according to [9] or [10] above, wherein the storage modulus at 150° C. is at least 25% of the maximum storage modulus.

[12] The continuous fiber-reinforced molded resin according to any one of [9] to [11], wherein the shear viscosity is 330 $MPa \cdot s^{-1}$ or greater.

[13] A continuous fiber-reinforced molded resin comprising continuous reinforcing fibers and a thermoplastic resin, and having a bending storage modulus of 22 GPa or greater.

[14] The continuous fiber-reinforced molded resin according to [13] above, wherein the bending storage modulus at 150° C. is at least 76% of the storage modulus at 30° C.

[15] The continuous fiber-reinforced molded resin according to [13] or [14] above, wherein the bending storage modulus retention when cut diagonally is 58% or higher.

[16] The continuous fiber-reinforced molded resin according to any one of [13] to [15] above, wherein the tensile storage modulus at 50° C. is 22 GPa or greater.

[17] The continuous fiber-reinforced molded resin according to any one of [13] to [16] above, wherein the maximum tensile loss tangent is 0.037 or lower.

[18] The continuous fiber-reinforced molded resin according to any one of [13] to [17] above, wherein the temperature at which the tensile storage modulus and bending storage modulus are reversed is 95° C. or higher.

[19] The continuous fiber-reinforced molded resin according to any one of [13] to [18] above, wherein {(tensile storage modulus−bending storage modulus) at 30° C.}/{(bending storage modulus−tensile storage modulus) at 200° C.}≥1.

[20] A continuous fiber-reinforced molded resin comprising continuous reinforcing fibers with approximately circular cross-sections and two or more thermoplastic resins, wherein at the interface between a single continuous reinforcing fiber and the thermoplastic resin in a cross-section perpendicular to the lengthwise direction of the continuous reinforcing fiber, in a region of the outer peripheral edge separated from the perimeter of the continuous reinforcing fiber by 1/10 of the radius of a single continuous reinforcing fiber of the two or more different types, the proportion of the two or more thermoplastic resins that is occupied by resin other than the resin with the highest occupying proportion of the entire resin region, is higher than the proportion occupied by the resin with the highest occupying proportion of the entire resin region, while in the resin region other than that region of the outer peripheral edge, each of the resins other than the resin with the highest occupying proportion of the entire resin region, of the two or more thermoplastic resins, is either evenly dispersed or mixed.

[21] The continuous fiber-reinforced molded resin according to [20] above, wherein the two or more thermoplastic resins have a sea-island structure.

[22] The continuous fiber-reinforced molded resin according to [20] or [21] above, wherein the difference between the melting point of the resin with the highest melting point and the melting point of the resin with the lowest melting point of the two or more thermoplastic resins is 100° C. or greater.

[23] The continuous fiber-reinforced molded resin according to any one of [20] to [21] above, wherein the melting point of the mixture of the two or more thermoplastic resins is essentially the same as the melting point of the resin with the highest occupying proportion of the entire resin region, of the two or more thermoplastic resins.

[24] The continuous fiber-reinforced molded resin according to any one of [20] to [23] above, wherein the difference between the melting peak temperature during temperature increase and the crystallization peak temperature during temperature decrease for the mixture of the two or more thermoplastic resins is smaller than the difference between the melting peak temperature during temperature increase and the crystallization peak temperature during temperature decrease for the resin with the highest occupying proportion of the entire resin region, of the two or more thermoplastic resins.

[25] The continuous fiber-reinforced molded resin according to any one of [20] to [24] above, wherein of the two or more thermoplastic resins, the bonding strength between at least one resin other than the resin with the highest occupying proportion of the entire resin region and the continuous reinforcing fibers is larger than the bonding strength between the resin with the highest occupying proportion of the entire resin region and the continuous reinforcing fibers.

[26] The continuous fiber-reinforced molded resin according to any one of [20] to [25] above, wherein of the two or more thermoplastic resins, the difference in surface tension between at least one resin other than the resin with the highest occupying proportion of the entire resin region and the continuous reinforcing fibers is smaller than the difference in surface tension between the resin with the highest occupying proportion of the entire resin region and the continuous reinforcing fibers.

[27] The continuous fiber-reinforced molded resin according to any one of [20] to [26] above, wherein of the two or more thermoplastic resins, the wettability of at least one resin other than the resin with the highest occupying proportion of the entire resin region for the continuous reinforcing fibers is higher than the wettability of the resin with the highest occupying proportion of the entire resin region for the continuous reinforcing fibers.

[28] A method for producing a continuous fiber-reinforced resin composite material, the method comprising the following steps:

a step of hot pressing continuous reinforcing fibers that have addition of a sizing agent comprising a coupling agent, binding agent and lubricating agent, with a thermoplastic resin having terminal functional groups that are reactive with the coupling agent, at above the melting point of the thermoplastic resin, and a step of cooling to below the melting point of the thermoplastic resin to obtain a continuous fiber-reinforced resin composite material as a molded article.

[29] The method according to [28] above, wherein the absorption percentage of the thermoplastic resin is 0.1 wt % or greater.

[30] The method according to [28] or [29] above, wherein at least 50 wt % of the sizing agent diffuses in the thermoplastic resin during hot pressing.

[31] The method according to any one of [28] to [30] above, wherein the coupling agent and the terminal functional groups of the thermoplastic resin are bonded.

[32] The method according to any one of [28] to [31] above, wherein the amount of terminal functional groups in the continuous fiber-reinforced resin composite material is less than the amount of terminal functional groups in the thermoplastic resin.

[33] The method according to any one of [28] to [32] above, wherein the amount of terminal functional groups is 90% or less of the amount of terminal functional groups in the thermoplastic resin.

[34] The method according to any one of [28] to [33] above, wherein the content of particulate additives in the thermoplastic resin is 30 ppm or lower.

[35] The method according to any one of [28] to [34] above, wherein the thermoplastic resin is a polyamide resin, and the amount of carboxyl ends in the polyamide resin, as terminal functional groups that are reactive with the coupling agent, is at least 65 μmol/g.

[36] The method according to any one of [28] to [35] above, wherein the thermoplastic resin is a polyamide resin, and the amount of amino ends in the polyamide resin, as terminal functional groups that are reactive with the coupling agent, is 40 μmol/g or lower.

[37] A method for producing a shaped molded article of a continuous fiber-reinforced resin composite material, comprising a step of heating a continuous fiber-reinforced resin composite material produced by the method according to any one of [28] to [36] at above the melting point of the thermoplastic resin, pressing it using a die, and then cooling to a temperature below the melting point of the thermoplastic resin and shaping it.

[38] The method according to [37] above, wherein compression is carried out during the cooling.

[39] A method for producing a fiber-reinforced molded resin, comprising a step of hot pressing reinforcing fibers and a thermoplastic resin that has a μ-drop formation coefficient with the reinforcing fibers of 10 or greater, to above the melting point of the thermoplastic resin, and a step of cooling to below the crystallization temperature of the thermoplastic resin.

[40] A fiber-reinforced molded resin comprising glass fibers and a polyamide resin, wherein when the fiber-reinforced molded resin is cut and the polished surface that has been polished with a force of 400 g/cm$^2$ is observed by SEM, at the interface between a single glass fiber and the polyamide resin in a cross-section perpendicular to the lengthwise direction of the glass fiber, the number of glass fibers in which the void percentage within the region of the outer peripheral edge separated from the perimeter of the glass fiber by 1/10 of the radius of a single glass fiber is 10% or lower, is at least 90% of the total number of glass fibers.

[41] The continuous fiber-reinforced molded resin according to [40] above, wherein the glass fibers are continuous fibers.

[42] A communication device housing constituted by a composite material molded article comprising a thermoplastic resin and continuous glass reinforcing fibers, wherein the tensile strength satisfies the relationship specified by the following formula (3):

$$\text{Tensile strength } (MPa) \text{ in lengthwise direction} \times 0.5 + \text{tensile strength } (MPa) \text{ in widthwise direction} \times 0.5 > 500\ MPa, \quad \text{Formula (3)}$$

the flexural modulus satisfies the relationship specified by the following formula (4):

$$\text{Flexural modulus } (MPa) \text{ in lengthwise direction} \times 0.5 + \text{flexural modulus } (MPa) \text{ in widthwise direction} \times 0.5 > 30\ MPa, \quad \text{Formula (4)}$$

and the electric field shielding property measured by the KEC method is 10 dB or lower in the frequency band of 1 GHz.

[43] A continuous fiber-reinforced molded resin constituted by continuous reinforcing fibers and a thermoplastic resin, wherein the breaking strength due to interlayer separation is 40 MPa or higher in acoustic emission measurement.

Advantageous Effects of Invention

The continuous fiber-reinforced molded resin of the invention has high adhesive force and affinity at the interface between the continuous reinforcing fibers and the synthetic resin, has small voids in the interface and exhibits adequate strength, rigidity and impact strength and high long-term properties, while also having a sufficiently small loss tangent and exhibiting sufficient shock absorption, having a sufficiently large storage modulus and exhibiting sufficient impact strength, and having a high resin impregnating property and high strength and rigidity.

DESCRIPTION OF EMBODIMENTS

Embodiments of the invention will now be explained in detail.

Continuous Fiber-Reinforced Molded Resin

The continuous fiber-reinforced molded resin of the embodiment is a continuous fiber-reinforced molded resin constituted by continuous reinforcing fibers with an approximately circular cross-section and a synthetic resin, wherein preferably, the number of continuous reinforcing fibers in which the void percentage in the region of the outer peripheral edge separated from the perimeter of the continuous reinforcing fiber by 1/10 of the radius of a single continuous reinforcing fiber, at the interface between each single continuous reinforcing fiber and the synthetic resin in a cross-section perpendicular to the lengthwise direction of the continuous reinforcing fiber, is 10% or lower, is at least 10% of the total number of continuous reinforcing fibers, the loss tangent (tan δ) is 0.11 or lower with dynamic viscoelasticity measurement in twisting mode, the storage modulus is 3.4 GPa or greater with dynamic viscoelasticity measurement in twisting mode, and the storage modulus is 22 GPa or greater in bending mode. When two or more different thermoplastic resins are used, preferably at the interface between a single continuous reinforcing fiber and the thermoplastic resin in a cross-section perpendicular to the lengthwise direction of the continuous reinforcing fiber, in a region of the outer peripheral edge separated from the perimeter of the continuous reinforcing fiber by 1/10 of the radius of a single continuous reinforcing fiber (also referred to as the "interface region"), the proportion of the two or more thermoplastic resins that is occupied by a resin (also referred to as "secondary resin") other than the resin with the highest occupying proportion of the entire resin region (also referred to as "primary resin"), is higher than the proportion occupied by the resin with the highest occupying proportion of the entire resin region, while in the resin region other than that region of the outer peripheral edge (also referred to as "other resin region"), the resin (secondary resin) other than the resin with the highest occupying proportion of the entire resin region, of the two or more thermoplastic resins, is either evenly dispersed or mixed.

The method for producing a continuous fiber-reinforced resin composite material of this embodiment preferably comprises the following steps:

- a step of hot pressing continuous reinforcing fibers that have addition of a sizing agent comprising a coupling agent, binding agent and lubricating agent, with a thermoplastic resin having terminal functional groups that are reactive with the coupling agent, at above the melting point of the thermoplastic resin, and
- a step of cooling to below the melting point of the thermoplastic resin to obtain a continuous fiber-reinforced resin composite material as a molded article.

Figure 1:
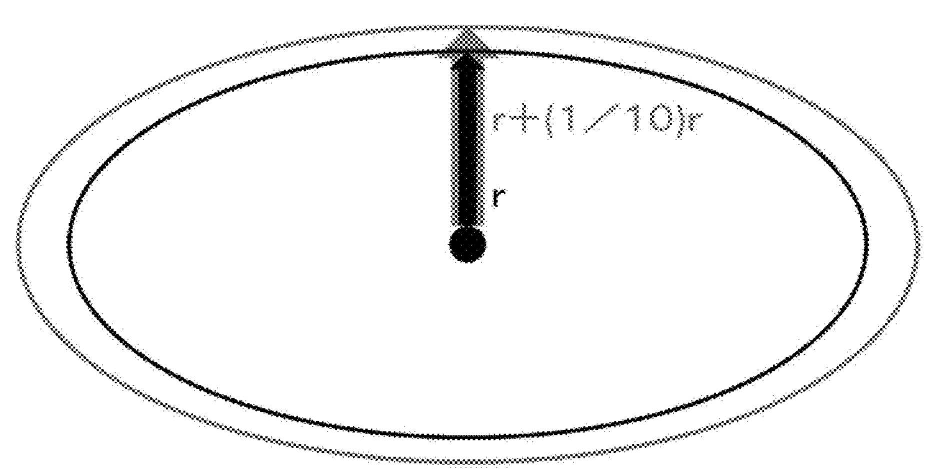
FIG. 1 is a diagram illustrating the "voids" and "void percentage" in the region of the outer peripheral edge separated from the perimeter of the continuous reinforcing fiber by 1/10 of the radius of the single continuous reinforcing fiber, at the interface between a single continuous reinforcing fiber and the synthetic resin (interface region), in a cross-section perpendicular to the lengthwise direction of the continuous reinforcing fiber.

In other words, as shown in FIG. 1, the continuous fiber-reinforced molded resin of the embodiment is a continuous fiber-reinforced molded resin comprising continuous reinforcing fibers with approximately circular cross-sections and a synthetic resin, wherein continuous reinforcing fibers are present which have a void percentage of 10% or lower in the region of the outer peripheral edge that is separated from the perimeter of each continuous reinforcing fiber by 1/10 of the radius r of a single continuous reinforcing fiber (i.e., r/10) in the radial direction (also referred to as "interface region"), when observed at the interface between a single continuous reinforcing fiber and the synthetic resin in a cross-section perpendicular to the lengthwise direction of the continuous reinforcing fiber, and their number is at least 10% of the total number of continuous reinforcing fibers. While the cross-sections of the continuous reinforcing fibers are preferably approximately circular cross-sections, they may also be ellipsoid as shown in FIG. 1. Here, "radius" means the shortest distance from the center of the fiber cross-section toward the perimeter.

Figure 7:
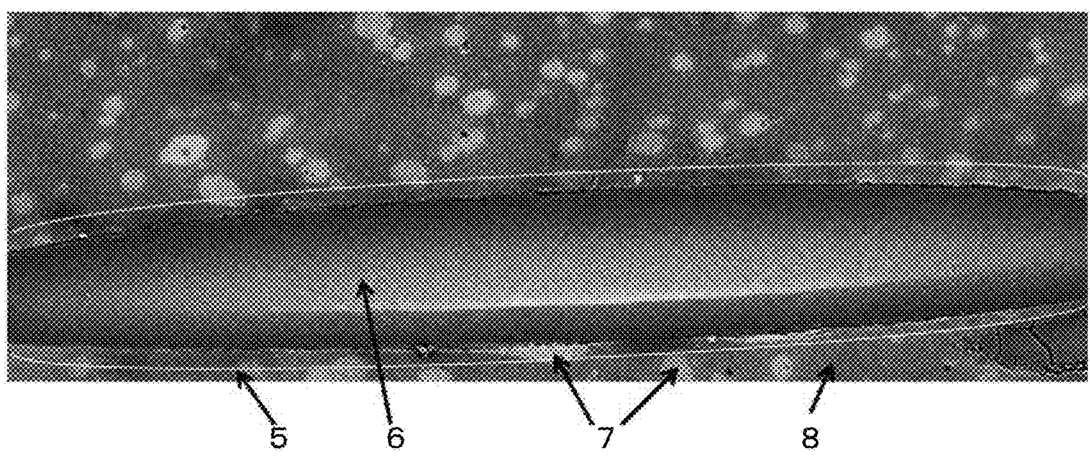
FIG. 7 is a photograph in lieu of a drawing, showing a state where, at the interface between a single continuous reinforcing fiber and a synthetic resin in a cross-section along the lengthwise direction of a continuous reinforcing fiber with an approximately circular cross-section, in a region of the outer peripheral edge separated from the perimeter of the continuous reinforcing fiber by 1/10 of the radius of the single continuous reinforcing fiber, the proportion of the two or more thermoplastic resins that is occupied by resin other than the resin with the highest occupying proportion of the entire resin region, is higher than the proportion occupied by the resin with the highest occupying proportion of the entire resin region, but in the resin region other than that region of the outer peripheral edge, the resin other than the resin with the highest occupying proportion of the entire resin region, of the two or more thermoplastic resins, is evenly dispersed.
Figure 8:
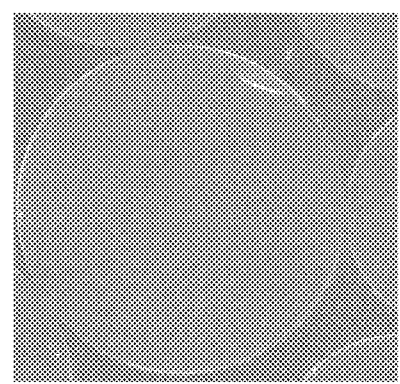
FIG. 8 is a photograph of the interface regions for Example 6-1.
Figure 9:
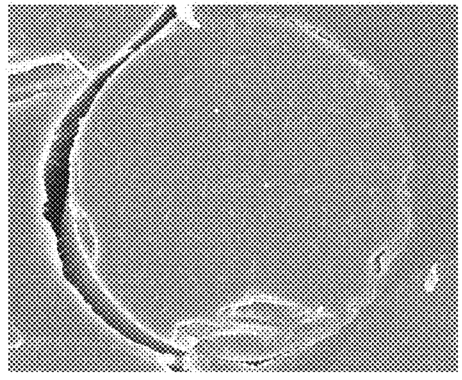
FIG. 9 is a photograph of the interface regions for Comparative Example 6-2.

In the continuous fiber-reinforced molded resin of the embodiment, preferably the occupying ratio of the secondary resin of the two or more thermoplastic resins is higher than the occupying ratio of the primary resin, in the interface region. This state is illustrated in FIG. 7.

The void percentage in the "region of the outer peripheral edge separated from the perimeter of the continuous reinforcing fiber by 1/10 of the radius of a single continuous reinforcing fiber, as observed at the interface between a single continuous reinforcing fiber and the synthetic resin in a cross-section perpendicular to the lengthwise direction of the continuous reinforcing fiber" can be determined by the following formula:

$$\text{Void percentage(\%)} = \big(\text{area of voids in region of outer peripheral edge separated from perimeter of continuous reinforcing fiber by 1/10 of radius of continous reinforcing fiber}\big) / \big(\text{area of region of outer peripheral edge separated from perimeter of continuous reinforcing fiber by 1/10 of radius of continuous reinforcing fiber}\big) \times 100,$$

after, for example, rotating a lengthwise-perpendicular cross-section of a continuous reinforcing fiber of the continuous fiber-reinforced molded resin cut to 1 cm-square with a band saw, on a polishing table rotating at 100 rpm, with a force of 400 g/cm$^2$ applied to the polishing surface, polishing it at approximately 7 mL/min in the order: 10 minutes with #220 waterproof paper, 2 minutes with #400 waterproof paper, 5 minutes with #800 waterproof paper, 10 minutes with #1200 waterproof paper, 15 minutes with #2000 waterproof paper, 15 minutes with 9 μm silicon carbide film particles, 15 minutes with 5 μm alumina film particles, 15 minutes with 3 μm alumina film particles, 15 minutes with 1 μm alumina film particles and 10 minutes with 0.1 μm colloidal silica particles (BAIKALOX 0.1CR) with buffing paper foamed polyurethane, while adding water, observing the polished sample with a scanning electron microscope (SEM) and performing image analysis with software such as ImageJ.

First, the void percentage is determined for the region of the outer peripheral edge separated from the perimeter of an arbitrary single continuous reinforcing fiber with an approximately circular cross-section by a distance of 1⁄10 of the radius (the "region of 1⁄10 of the diameter of a continuous reinforcing fiber" will hereunder also be referred to simply as "interface region"), and is observed for 100 arbitrary selected fibers. In the molded article of this embodiment, preferably at least 10%, or 10 out of every 100, more preferably at least 20%, even more preferably at least 50%, yet more preferably at least 70% and most preferably at least 90%, of the fibers have a void percentage of 10% or lower in the region of 1⁄10 of the diameter of the continuous reinforcing fiber, from the viewpoint of increasing the rigidity and strength of the molded article.

In the molded article of the embodiment, the void percentage in the region of 1⁄10 of the diameter of the continuous reinforcing fiber is preferably 5% or lower, more preferably 2% or lower and even more preferably 1% or lower, from the viewpoint of increasing the rigidity and strength of the molded article.

In order to have at least 10% of 100 fibers with a void percentage of 10% or lower in the region of 1⁄10 of the diameter of the continuous reinforcing fiber, when the continuous reinforcing fibers are glass fibers, for example, the sizing agent coated during production of the glass fiber is selected to be one such that the μ-drop formation coefficient between the sizing agent and the synthetic resin is 10 or greater, and their compatibility is satisfactory, while the molding method selected is either a molding method allowing the die interior to be sealed during molding, such as using an inlay die, or a molding method using a double belt press with adjustable pressure, whereby leakage of the resin is prevented and variation in the volume of the continuous fiber-reinforced molded resin occupied by the glass fibers (Vf, also known as the volume content) before and after molding is reduced, and molding is carried out under temperature conditions suited for the sizing agent.

The loss tangent in twisting mode can be calculated from the peak top value of the loss tangent based on viscoelasticity measurement of the continuous fiber-reinforced molded resin cut with a band saw at 0° and 90° directions with respect to the continuous fiber in twisting mode, under a nitrogen atmosphere and with a constant temperature-elevating rate, for example. The loss tangent of the continuous fiber-reinforced molded resin of the embodiment in twisting mode is preferably 0.11 or lower, more preferably 0.10 or lower, even more preferably 0.095 or lower, even more preferably 0.090 or lower and most preferably 0.087 or lower.

The temperature at which the peak top of the loss tangent of the continuous fiber-reinforced molded resin of the embodiment in twisting mode is exhibited is preferably 78° C. or higher, more preferably 80° C. or higher, even more preferably 82° C. or higher and most preferably 84° C. or higher.

For the continuous fiber-reinforced molded resin of the embodiment, preferably two peak tops emerge when the loss tangent is plotted against each temperature, and the difference between the two peak tops is preferably no greater than 80° C., more preferably no greater than 60° C., even more preferably no greater than 50° C. and most preferably no greater than 35° C.

In order to produce a continuous fiber-reinforced molded resin having a loss tangent of 0.11 or lower, when the continuous reinforcing fibers are glass fibers, for example, the sizing agent coated during production of the glass fiber is selected to be one such that the μ-drop formation coefficient between the sizing agent and the synthetic resin is 10 or greater, and their compatibility is satisfactory, while the molding method selected is either a molding method allowing the die interior to be sealed during molding, such as using an inlay die, or a molding method using a double belt press with adjustable pressure, whereby leakage of the resin is prevented and variation in the volume of the continuous fiber-reinforced molded resin occupied by the glass fibers (Vf, also known as the volume content) before and after molding is reduced, and molding is carried out under temperature conditions suited for the sizing agent.

The storage modulus in twisting mode can be calculated from the peak top value of the storage modulus when the storage modulus is plotted against each temperature, based on viscoelasticity measurement of the continuous fiber-reinforced molded resin cut with a band saw at 0° and 90° directions with respect to the continuous fiber in twisting mode, under a nitrogen atmosphere and with a constant temperature-elevating rate, for example. The storage modulus of the continuous fiber-reinforced molded resin of the embodiment in twisting mode is preferably 3.4 GPa or greater, more preferably 3.5 GPa or greater, even more preferably 4.0 GPa or greater, yet more preferably 4.5 GPa or greater, even yet more preferably 6.0 GPa or greater and most preferably 7.0 GPa or greater.

For the continuous fiber-reinforced molded resin of the embodiment, the storage modulus when measurement of the storage modulus is carried out using a test piece cut in the 45° direction (diagonal direction) of the continuous fiber of the continuous fiber-reinforced molded resin, is preferably at least 1.5 times, more preferably at least 1.6 times, even more preferably at least 1.7 times and most preferably at least 1.9 times the storage modulus when the measurement is carried out using test pieces cut in the 0° and 90° directions.

For the continuous fiber-reinforced molded resin of the embodiment, the storage modulus at 150° C. is preferably at least 25% and more preferably at least 26% of the maximum storage modulus.

In viscoelasticity measurement of the continuous fiber-reinforced molded resin of the embodiment in twisting mode, the shear viscosity is preferably 330 $MPa \cdot s^{-1}$ or greater, more preferably 470 $MPa \cdot s^{-1}$ or greater, even more preferably 500 $MPa \cdot s^{-1}$ or greater and most preferably 700 $MPa \cdot s^{-1}$ or greater.

In order to produce a continuous fiber-reinforced molded resin having a storage modulus of 3.4 GPa or greater in twisting mode, when the continuous reinforcing fibers are glass fibers, for example, the sizing agent coated during production of the glass fiber is selected to be one such that the μ-drop formation coefficient between the sizing agent and the synthetic resin is 10 or greater, and their compatibility is satisfactory, while the molding method selected is either a molding method allowing the die interior to be sealed during molding, such as using an inlay die, or a molding method using a double belt press with adjustable pressure, whereby leakage of the resin is prevented and variation in the volume of the continuous fiber-reinforced molded resin occupied by the glass fibers (Vf, also known as the volume content) before and after molding is reduced, and molding is carried out under temperature conditions suited for the sizing agent.

The bending storage modulus can be calculated from the maximum storage modulus when the storage modulus is plotted against each temperature, based on viscoclasticity measurement of the continuous fiber-reinforced molded resin cut with a band saw at 0° and 90° directions with respect to the continuous fiber in bending mode, under a nitrogen atmosphere and with a constant temperature-elevating rate, for example. The bending storage modulus of the continuous fiber-reinforced molded resin of the embodiment is preferably 22 GPa or greater, more preferably 23 GPa or greater, even more preferably 25 GPa or greater, yet more preferably 31 GPa or greater and most preferably 36 GPa or greater.

In the continuous fiber-reinforced molded resin of the embodiment, the bending storage modulus when measured at 150° C. is preferably at least 76% of the bending storage modulus at 30° C.

For the continuous fiber-reinforced molded resin of the embodiment, the bending storage modulus, when measurement of the bending storage modulus is carried out using a test piece cut in the 45° direction (diagonal direction) of the continuous fiber of the continuous fiber-reinforced molded resin, is preferably at least 58%, more preferably at least 60% and even more preferably at least 62% of the bending storage modulus when the measurement is carried out using test pieces cut in the 0° or 90° direction.

The tensile storage modulus and tensile loss tangent can be calculated based on viscoelasticity measurement of the continuous fiber-reinforced molded resin cut with a band saw at 0° and 90° directions with respect to the continuous fiber in tension mode, under a nitrogen atmosphere and with a constant temperature-elevating rate, for example. The tensile storage modulus of the continuous fiber-reinforced molded resin of the embodiment at 50° C. is preferably 22 GPa or greater, more preferably 25 GPa or greater, even more preferably 30 GPa or greater, yet more preferably 32 GPa or greater, even yet more preferably 35 GPa or greater and most preferably 40 GPa or greater.

The maximum tensile loss tangent can be determined as the maximum point on the plot of the loss tangent at each temperature, obtained by the aforementioned measurement. The maximum loss tangent of the continuous fiber-reinforced molded resin of the embodiment is preferably 0.037 or lower, more preferably 0.035 or lower and even more preferably 0.032 or lower.

For the continuous fiber-reinforced molded resin of the embodiment, the temperature at which the values of the tensile storage modulus and bending storage modulus are reversed is preferably 95° C. or higher, more preferably 100° C. or higher and even more preferably 105° C. or higher, when the tensile storage modulus and bending storage modulus are plotted against each temperature.

When the tensile storage modulus and bending storage modulus are plotted against each temperature for the continuous fiber-reinforced molded resin of the embodiment, preferably the following formula is satisfied:

$$\{(\text{Tensile storage modulus} - \text{bending storage modulus}) + 30° \text{ C.}\}/\{(\text{bending storage modulus} - \text{tensile storage modulus}) \text{ at } 200° \text{ C.}\} \geq 1$$

In order to produce a continuous fiber-reinforced molded resin having a bending storage modulus of 22 GPa or greater, when the continuous reinforcing fibers are glass fibers, for example, the sizing agent coated during production of the glass fibers is selected to be one such that the μ-drop formation coefficient between the sizing agent and the synthetic resin is 10 or greater, and their compatibility is satisfactory, while the molding method selected is either a molding method allowing the die interior to be sealed during molding to inhibit flow of the resin, such as using an inlay die, or a molding method using a double belt press with adjustable pressure, whereby leakage of the resin is prevented and variation in the volume of the continuous fiber-reinforced molded resin occupied by the glass fibers (Vf, also known as the volume content) before and after molding is reduced, and molding is carried out while forming a satisfactory boundary interface, under temperature conditions suited for the sizing agent.

The proportion of the region of the outer peripheral edge of the continuous fiber-reinforced molded resin of the embodiment that is occupied by each thermoplastic resin (the area ratio) can be determined by cutting a cross-section in the thickness direction of the continuous fiber-reinforced molded resin (a cross-section perpendicular to the lengthwise direction of the continuous reinforcing fibers), embedding it in an epoxy resin and polishing it while taking care that the continuous reinforcing fibers are not damaged, and then taking a mapping image of the cross-section with a laser Raman microscope and identifying the type of resins in the fiber-reinforced resin from the obtained image and spectrum, and calculating the area of each by image processing with imageJ software.

The distribution of the thermoplastic resins in the resin region other than the interface region of the fiber-reinforced molded resin can be determined, for example, by polishing a cross-section (cross-section perpendicular to the lengthwise direction of the continuous reinforcing fibers) of the continuous fiber-reinforced molded resin that has been cut at a cross-section in the thickness direction (a cross-section perpendicular to the lengthwise direction of the continuous reinforcing fibers), with a force of 125 $g/cm^2$ on the polished surface, for 10 minutes with #220 waterproof paper, 10 minutes with #1200 waterproof paper, 5 minutes with #2000 waterproof paper, 10 minutes with a silicon carbide film having a particle size of 9 μm, 10 minutes with an alumina film having a particle size of 5 μm, 5 minutes with an alumina film having a particle size of 3 μm, 5 minutes with an alumina film having a particle size of 1 μm, and 5 minutes with colloidal silica having a particle size of 0.1 μm (BAI-KALOX 0.1CR) and comprising foam polyurethane buffing paper, while adding water at about 7 mL/min for each polishing, subjecting the polished sample to electron staining with phosphotungstic acid, and then observing it with a scanning electron microscope (SEM) and performing image analysis with software such as ImageJ. The proportion occupied by the thermoplastic resin can be determined by observing 10 arbitrary points and calculating the average.

Regarding the volume ratio between the continuous reinforcing fibers and the synthetic resin, such as the thermoplastic resin, since a higher Vf leads to a molded article with higher strength, the continuous fiber-reinforced molded resin of the embodiment is preferably one wherein the volume content Vf of the continuous reinforcing fibers in the continuous fiber-reinforced molded resin is 40% or higher, more preferably 45% or higher, even more preferably 50% or higher, yet more preferably 55% or higher and most preferably 65% or higher. With fiber-reinforced molded resins of the prior art, it has not been possible to increase the void percentage and to increase the high tensile stress (tensile strength) or flexural modulus (flexural rigidity) of the molded article, even if the Vf is increased, but with the continuous fiber-reinforced molded resin of the embodiment, by reducing the void percentage, a synthetic resin impregnation rate of 99% or higher in the continuous fiber-reinforced resin composite, a tensile stress of 525 MPa or higher and a flexural modulus of 27 GPa or greater are simultaneously achieved at Vf 50%, and a synthetic resin impregnation rate of 99% or higher, a tensile stress of 600 MPa or higher and a flexural modulus of 35 GPa or greater are simultaneously achieved at Vf 65%.

When the continuous reinforcing fibers are glass fibers, the tensile stress of the continuous fiber-reinforced molded resin is preferably 480 MPa or higher, more preferably 525 MPa or higher, even more preferably 600 MPa or higher and most preferably 620 MPa or higher, as the average value from testing in different directions in which the glass fibers are essentially oriented. The flexural modulus of the continuous fiber-reinforced molded resin is preferably 22 GPa or greater, more preferably 27 GPa or greater, even more preferably 30 GPa or greater and most preferably 35 GPa or greater, as the average value from testing in different directions in which the glass fibers are essentially oriented. The tensile stress and flexural modulus are the values when the continuous reinforcing fibers in the continuous fiber-reinforced molded resin are oriented in essentially biplanar directions, being average values for testing in biplanar directions parallel to the continuous reinforcing fibers. For a three-directional material, ⅔ stress or rigidity is preferred, and for an n-directional material, 2/n stress or rigidity is preferred.

When the continuous reinforcing fibers are glass fibers, the value of the number of directions in which the glass fibers are essentially oriented multiplied by the average value of the tensile stress when testing in different directions in which the glass fibers of the continuous fiber-reinforced molded resin are essentially oriented, is preferably 960 MPa or higher, more preferably 1050 MPa or higher, even more preferably 1200 MPa or higher and most preferably 1240 MPa or higher. Also, the value of the number of directions in which the glass fibers are essentially oriented multiplied by the average value of the flexural stress when testing in different directions in which the glass fibers of the continuous fiber-reinforced molded resin are essentially oriented, is preferably 1260 MPa or higher, more preferably 1400 MPa or higher, even more preferably 1600 MPa or higher and most preferably 1700 MPa or higher. The value of the flexural modulus of the continuous fiber-reinforced molded resin multiplied by the number of directions in which the glass fibers are essentially oriented is preferably 44 GPa or greater, more preferably 54 GPa or greater, even more preferably 60 GPa or greater and most preferably 70 GPa or greater. The elasticity index of the continuous fiber-reinforced molded resin, defined by the following formula:

Elasticity index=(average value of elastic modulus in directions parallel to the directions in which glass fibers are essentially oriented×number of directions in which glass fibers are essentially oriented)/(Vf×elastic modulus of glass fibers)

is preferably 1.2 or higher, more preferably 1.3 or higher, even more preferably 1.4 or higher, yet more preferably 1.5 or higher and most preferably 1.58 or higher.

Measurement by Acoustic Emission (AE) Method

In measurement by the acoustic emission method, the continuous fiber-reinforced molded resin of the embodiment has an interlayer separation-induced breaking strength of preferably 40 MPa or higher and more preferably 50 MPa or higher.

Measurement by the acoustic emission method can be carried out by attaching an AE sensor in an interlaminar shear test (JIS K7078).

Form of Continuous Fiber-Reinforced Molded Resin

The form of the continuous fiber-reinforced molded resin is not particularly restricted, and the following forms are possible. For example, it may be in the form of a woven fabric or knitted fabric, a braid or a pipe form of the reinforcing fibers in combination with a resin, in the form of reinforcing fibers aligned in one direction and composited with a resin, in the form of yarns comprising reinforcing fibers and a resin aligned and molded in one direction, or in the form of yarn comprising reinforcing fibers and a resin that has been molded as a woven fabric or knitted fabric, a braid or a pipe form.

The form of the intermediate material of the continuous fiber-reinforced molded resin before molding may be combined filament yarn comprising continuous reinforcing fibers and resin fibers, coating yarn wherein the periphery of a continuous reinforcing fiber bundle is covered with a resin, a tape-like form with the resin impregnating the continuous reinforcing fibers beforehand, continuous reinforcing fibers sandwiched between resin films, resin powder adhering to continuous reinforcing fibers, a continuous reinforcing fiber bundle as the core material surrounded with a resin fiber braid, or a reinforcing fiber bundle impregnated with a resin beforehand.

Method for Producing Continuous Fiber-Reinforced Molded Resin (Composite Material)

The method for producing a continuous fiber-reinforced resin composite material of this embodiment preferably comprises the following steps:

a step of hot pressing continuous reinforcing fibers that have addition of a sizing agent comprising a coupling agent, binding agent and lubricating agent, with a thermoplastic resin having terminal functional groups that are reactive with the coupling agent, at above the melting point of the thermoplastic resin, and a step of cooling to below the melting point of the thermoplastic resin to obtain a continuous fiber-reinforced resin composite material as a molded article.

The amount of terminal functional groups of the continuous fiber-reinforced resin composite material after hot pressing is preferably less than the amount of terminal functional groups in the thermoplastic resin before hot pressing from the viewpoint of adhesion between the thermoplastic resin and the continuous reinforcing fibers, the amount of terminal functional groups of the continuous fiber-reinforced resin composite material after hot pressing being preferably 90% or lower and more preferably 85% or lower compared to the amount of terminal functional groups in the thermoplastic resin before hot pressing.

From the viewpoint of reactivity of the coupling agent of the sizing agent and the terminal functional groups of the thermoplastic resin, the flow rate of the thermoplastic resin during hot pressing is preferably 10% or lower, more preferably 8% or lower, even more preferably 5% or lower and most preferably 3% or lower.

When polypropylene is used as the thermoplastic resin, for example, the reactive terminal functional groups are maleic acid grafted onto the polypropylene resin as the main component.

The flow rate of the thermoplastic resin during hot pressing can be determined as (weight of thermoplastic resin burrs produced during hot pressing)/(weight of thermoplastic resin before hot pressing).

The method of hot pressing is not particularly restricted, but a hot pressing method using a double belt press is preferred from the viewpoint of productivity. As the base material, the reinforcing fibers and thermoplastic resin may be fed out from multiple rolls and introduced into a double belt press apparatus, or the reinforcing fibers and thermoplastic resin cut to a desired size may be stacked in the desired number and introduced. A guide sheet such as a TEFLON® sheet may also be introduced in front of and behind the base material.

Another preferred hot pressing method is one carried out with a die. Pressing with a die is not particularly restricted, and any of the following methods are possible. For example, the base material that is to compose the continuous fiber-reinforced molded resin may be cut to match the desired molded article shape and layered in the necessary number for the thickness of the target product, and set in a manner conforming to the die shape.

Cutting of the base material may be carried out one at a time, or any number may be stacked and cut together. From the viewpoint of productivity, a plurality are preferably cut in a stacked state. Any method may be used for cutting, examples of which include methods using a water jet, blade press machine, hot blade press machine, laser or plotter. A hot blade press machine is preferred, for an excellent cross-sectional shape, and also better handleability by welding of the edges when a multiple stack is cut. A suitable cutting shape can be adjusted by repeated trial and error, but it is preferably set by carrying out a simulation with CAE (computer aided engineering), matching the die shape.

After the base material has been set in the die, the die is closed and the material is pressed (compressed). The die is adjusted to a temperature at or above the melting point of the thermoplastic resin composing the continuous fiber-reinforced molded resin, to melt the thermoplastic resin and shape it. The mold clamping pressure is not particularly stipulated but is preferably 1 MPa or higher and more preferably 3 MPa or higher. The mold is clamped once for compression molding to remove the gas, after which the die mold clamping pressure is released. From the viewpoint of exhibiting strength, the compression molding time is preferably as long as possible in a range that does not result in heat degradation of the thermoplastic resin, and from the viewpoint of productivity, it is preferably no longer than 2 minutes and more preferably no longer than 1 minute.

In the production steps for a continuous fiber-reinforced molded resin, the base material is set into a die and the die is closed and pressurized, and after a predetermined time has elapsed, it may be filled with a predetermined thermoplastic resin composition that is injected in and molded, joining the thermoplastic resin with the predetermined thermoplastic resin composition to produce a hybrid molded article.

The timing for injection filling of the predetermined thermoplastic resin composition will largely depend on the interfacial strength between both thermoplastic resins. The timing for injection filling of the predetermined thermoplastic resin composition is preferably no longer than 30 seconds after the die temperature has increased above the melting point and glass transition temperature of the thermoplastic resin, after the base material has been set in the die and the die has been closed.

The die temperature during injection filling of the predetermined thermoplastic resin composition is preferably at or above the melting point or glass transition temperature of the thermoplastic resin composing the continuous fiber-reinforced molded resin. More preferably, it is at or above the melting point+10° C. or the glass transition temperature+10° C., even more preferably at or above the melting point+20° C. or the glass transition temperature+20° C., and yet more preferably at or above the melting point+30° C. or the glass transition temperature+30° C., of the thermoplastic resin composing the continuous fiber-reinforced molded resin.

In the hybrid molded article described above, the joining section between the thermoplastic resin composing the continuous fiber-reinforced molded resin and the thermoplastic resin composition formed by injection molding preferably has an irregular structure where both are combined.

For increasing the interfacial strength it is effective for the die temperature to be at or above the melting point of the injected thermoplastic resin composition, and for the resin to be held at high pressure during injection molding, such as 1 MPa or higher. In order to increase the interfacial strength, the holding pressure is preferably 5 MPa or higher and more preferably 10 MPa or higher.

Holding for a long holding pressure time, such as 5 seconds or longer, preferably 10 seconds or longer and more preferably a period until the die temperature falls below the melting point of the thermoplastic resin composition, is preferred from the viewpoint of increasing the interfacial strength.

Injection Molding Resin

The thermoplastic resin composition for injection molding to be used for production of a hybrid molded article is not particularly restricted so long as it is a thermoplastic resin composition that can be used in ordinary injection molding.

Examples of such thermoplastic resin compositions include, but are not limited to, resin compositions of one or mixtures of two or more from among polyethylene, polypropylene, polyvinyl chloride, acrylic resin, styrene-based resin, polyethylene terephthalate, polybutylene terephthalate, polyallylate, polyphenylene ether, modified polyphenylene ether resin, total aromatic polyester, polyacetal, polycarbonate, polyetherimide, polyethersulfone, polyamide-based resin, polysulfone, polyether ether ketone and polyether ketone.

These thermoplastic resin compositions may also contain various fillers.

Such fillers include staple fiber and long fiber materials that are discontinuous reinforcing materials of the same types of materials as the reinforcing fibers.

When glass staple fibers and long fibers are used as discontinuous reinforcing materials, the same sizing agent may be used as is coated onto the continuous reinforcing fibers composing the continuous fiber-reinforced molded resin of the embodiment.

The sizing agent preferably comprises a (silane) coupling agent, a lubricating agent and a binding agent. The type of (silane) coupling agent, lubricating agent and binding agent used may be the same as in the sizing agent for the continuous reinforcing fibers described above.

A thermoplastic resin composition to be used in injection molding is preferably similar to, and more preferably identical to, the thermoplastic resin forming the continuous fiber-reinforced molded resin, from the viewpoint of interfacial strength between the continuous fiber-reinforced molded resin part and the injection-molded thermoplastic resin composition part. Specifically, when polyamide 66 fibers are used as the thermoplastic resin forming the continuous fiber-reinforced molded resin, it is preferred to use polyamide 66 for the resin material of the thermoplastic resin composition for injection molding.

Other methods include a method of molding by setting the base material in a die and compressing it with a double belt press machine, or a method of setting a frame surrounding the four sides of a set base material and compression molding it with a double belt press machine, or a method of molding by preparing a heating compression molding machine set to one or more temperatures and a cooling compression molding machine set to one or more temperatures, and loading the die in which the base material has been set into each compression molding machine in order for molding.

Resin Impregnation Rate of Continuous Fiber-Reinforced Molded Resin

Figure 2:
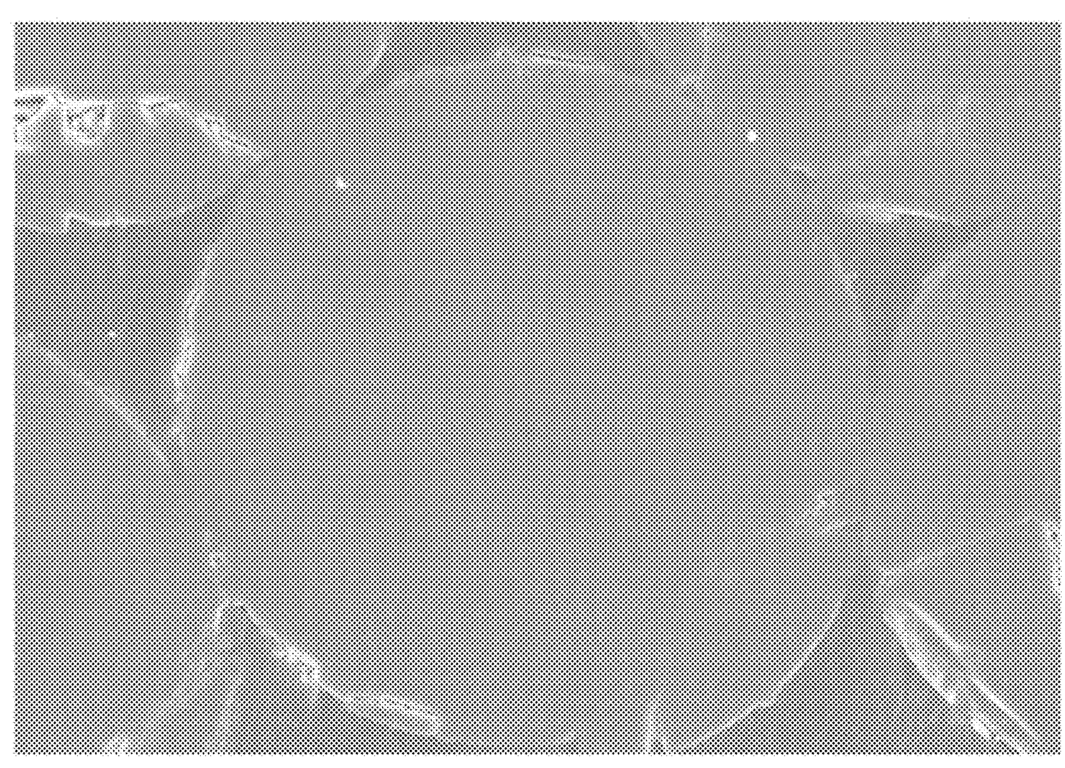
FIG. 2 is a photograph of the interface regions for Example 1-1, Example 2-1, Example 3-1 and Example 4-1.

As shown in FIG. 2, the impregnation rate of the thermoplastic resin in the continuous fiber-reinforced molded resin is determined by the proportion of voids in a cross-section of the continuous fiber-reinforced molded resin. Specifically, it is calculated by cutting the continuous fiber-reinforced molded resin at an arbitrary location, embedding it in an epoxy resin and polishing it, and then using analysis software to analyze an image obtained by optical microscope observation.

Figure 6:
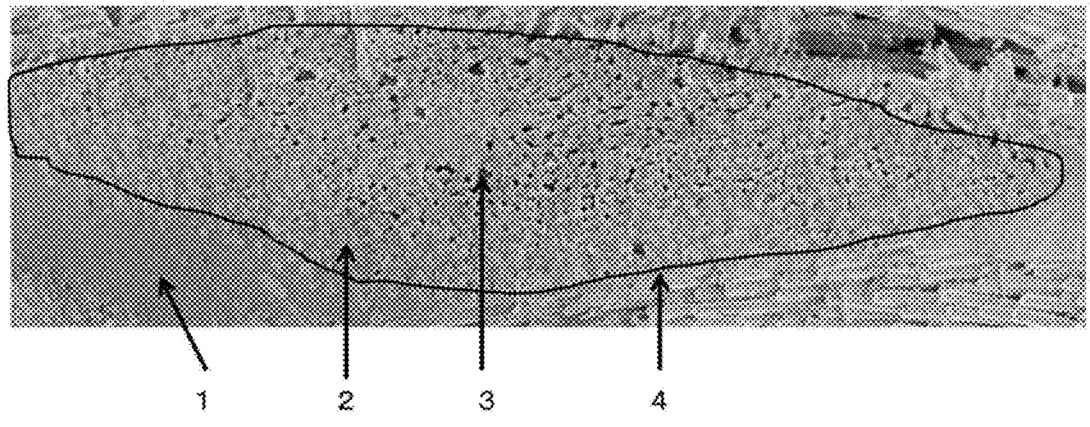
FIG. 6 is a photograph in lieu of a drawing, for illustration of the "impregnation rate" of a synthetic resin in a continuous fiber-reinforced molded resin.

As shown in FIG. 6, the impregnation rate (%) is calculated by the following formula:

$$\text{Impregnation rate}(\%) = \{1-(\text{void area/continous reinforcing fiber bundle area})\}\times 100$$

with a predetermined area as 100%. From the viewpoint of strength and outer appearance, the impregnation rate of the continuous fiber-reinforced molded resin of the embodiment is preferably 98% or higher, more preferably 99% or higher, even more preferably 99.5% or higher and most preferably 99.9% or higher.

Continuous Reinforcing Fibers

The continuous reinforcing fibers used may generally be any ones used for continuous fiber-reinforced molded resins.

Continuous reinforcing fibers include, but are not limited to, glass fibers, carbon fibers, plant fibers, aramid fibers, ultra-high strength polyethylene fibers, polybenzazole fibers, liquid crystal polyester fibers, polyketone fibers, metal fibers and ceramic fibers.

Glass fibers, carbon fibers, plant fibers and aramid fibers are preferred from the viewpoint of mechanical properties, thermal properties and general utility, while glass fibers are preferred from the viewpoint of productivity.

When glass fibers are selected as the continuous reinforcing fibers, a sizing agent may be used, the sizing agent preferably comprising a silane coupling agent, a lubricating agent and a binding agent. If the sizing agent is one that binds strongly to the resin coating the continuous reinforcing fibers, it will be possible to obtain a continuous fiber-reinforced molded resin with a low void percentage, and when a thermoplastic resin is used as the synthetic resin, the sizing agent is preferably a sizing agent for thermoplastic resins. A sizing agent for thermoplastic resins is one such that when the continuous reinforcing fibers are raised in temperature to 300° C. at 30° C./min in an electric furnace and then returned to room temperature, the rigidity of the continuous reinforcing fibers is greater than the rigidity of the continuous reinforcing fibers before heating. When a polyamide resin is selected as the synthetic resin, for example, the sizing agent for thermoplastic resins must be selected as one in which the silane coupling agent easily bonds with the terminal carboxyl groups and amino groups of the polyamide resin. Specific examples include γ-aminopropyltrimethoxysilane and epoxysilane.

It is necessary for the binding agent used to be a resin having good wettability with or similar surface tension as the polyamide resin. Specifically, a polyurethane resin emulsion or polyamide resin emulsion, or a modified form of the same, may be selected. It is necessary to use a lubricating agent that does not inhibit the silane coupling agent and binding agent, an example of which is carnauba wax.

From the viewpoint of impregnation of the thermoplastic resin into the continuous reinforcing fibers, the sizing agent preferably diffuses at least 50%, more preferably at least 70%, even more preferably at least 80% and most preferably at least 90%, in the thermoplastic resin during hot pressing. Diffusion of the sizing agent can be determined for the molded article by dissolving the matrix resin with a good solvent and performing XPS measurement of the remaining reinforcing fibers, and when the matrix resin is a polyamide, it is preferred to use HFIP or phenol.

If the sizing agent diffuses at least 90% in the thermoplastic resin during hot pressing, and terminal groups that are reactive with the coupling agent among the terminal functional groups of the thermoplastic resin are decreased before and after hot pressing, then the coupling agent has bonded with the terminal functional groups of the thermoplastic resin.

The continuous reinforcing fibers may also be coated with a catalyst that promotes reaction between the coupling agent and the terminal functional groups of the thermoplastic resin, and when glass fibers are selected as the continuous reinforcing fibers and a polyamide resin is selected as the thermoplastic resin, for example, examples of such a catalyst include phosphoric compounds such as sodium hypophosphite, which promote bonding reaction between the amino groups of the silane coupling agent and the terminal carboxyl groups of the polyamide resin.

Silane Coupling Agent

A silane coupling agent is usually used as a surface treatment agent for glass fibers, where it contributes to increased interfacial bonding strength.

Examples of silane coupling agents include, but are not limited to, aminosilanes such as γ-aminopropyltrimethoxysilane and N-β-(aminoethyl)-γ-aminopropylmethyldimethoxysilane; mercaptosilanes such as γ-mercaptopropyltrimethoxysilane and γ-mercaptopropyltriethoxysilane; epoxysilanes; and vinylsilanes and maleic acid. When a polyamide is used as the synthetic resin it is preferred to use an aminosilane or maleic acid, and when an epoxy resin is used as the synthetic resin it is preferred to use an epoxysilane.

Lubricating Agent

A lubricating agent contributes to improved openability of the glass fibers.

The lubricating agent used may be a common liquid or solid lubricating material, selected depending on the purpose, and it may be, but is not limited to, animal- or plant-based or mineral-based waxes such as carnauba wax or lanolin wax; and surfactants such as fatty acid amides, fatty acid esters, fatty acid ethers, aromatic esters and aromatic ethers.

Binding Agent

A binding agent contributes to improved bundling and increased interfacial bonding strength of glass fibers.

A binding agent that is used may be a polymer or thermoplastic resin, depending on the purpose.

Polymers to be used as binding agents include, but are not limited to, acrylic acid homopolymers, copolymers of acrylic acid and other copolymerizable monomers, and salts of these with primary, secondary or tertiary amines. Suitable examples to be used include polyurethane-based resins synthesized from isocyanates such as m-xylylene diisocyanate, 4,4'-methylenebis(cyclohexylisocyanate) and isophorone diisocyanate, and polyester-based or polyether-based diols.

An acrylic acid homopolymer has a weight-average molecular weight of preferably 1,000 to 90,000 and more preferably 1,000 to 25,000.

Examples of copolymerizable monomers for formation of copolymers of acrylic acid with other copolymerizable monomers include, but are not limited to, one or more monomers with hydroxyl and/or carboxyl groups, selected from the group consisting of acrylic acid, maleic acid, methacrylic acid, vinylacetic acid, crotonic acid, isocrotonic acid, fumaric acid, itaconic acid, citraconic acid and mesaconic acid (where acrylic acid alone is excluded). Preferred copolymerizable monomers are one or more ester-based monomers.

Primary, secondary or tertiary amine salts of acrylic acid homopolymers and copolymers include, but are not limited to, triethylamine salts, triethanolamine salt and glycine salts. The neutralization degree is preferably 20 to 90% and more preferably 40 to 60%, from the viewpoint of improving stability of the mixed solution with other agents (such as silane coupling agents), and reducing amine odor.

The weight-average molecular weight of a polymer of acrylic acid forming a salt is not particularly restricted but is preferably in the range of 3,000 to 50,000. It is preferably 3,000 or greater from the viewpoint of improved bundling of glass fibers, and preferably 50,000 or lower from the viewpoint of improving the properties as a composite molded article.

Examples of thermoplastic resins to be used as binding agents include, but are not limited to, polyolefin-based resins, polyamide-based resins, polyacetal-based resins, polycarbonate-based resins, polyester-based resins, polyether ketones, polyether ether ketones, polyether sulfones, polyphenylene sulfide, thermoplastic polyetherimides, thermoplastic fluorine-based resins, and modified thermoplastic resins obtained by modifying such resins. The thermoplastic resin used as a binding agent is preferably a thermoplastic resin and/or modified thermoplastic resin of the same type as the resin covering the periphery of the continuous reinforcing fibers, since this will improve adhesion between the glass fibers and thermoplastic resin after a composite molded article has been formed.

Especially in cases where adhesion between the continuous reinforcing fibers and the thermoplastic resin covering them is to be improved and a sizing agent is to be adhered to the glass fibers as an aqueous dispersion, it is preferred to use a modified thermoplastic resin as the thermoplastic resin of the binding agent, from the viewpoint of reducing the ratio of emulsifier component or limiting the need for an emulsifier.

A modified thermoplastic resin is one that has been copolymerized with a different monomer component other than a monomer component that can form the main chain of the thermoplastic resin, having its hydrophilicity, crystallinity or thermodynamic properties modified, in order to alter the properties of the thermoplastic resin.

Examples of modified thermoplastic resins to be used as binding agents include, but are not limited to, modified polyolefin-based resins, modified polyamide-based resins and modified polyester-based resins.

A modified polyolefin-based resin for the binding agent is a copolymer of an olefin-based monomer such as ethylene or propylene and a monomer that is copolymerizable with the olefin-based monomer, such as an unsaturated carboxylic acid, and it can be produced by a known method. It may be a random copolymer obtained by copolymerization of an olefin-based monomer and an unsaturated carboxylic acid, or a graft copolymer obtained by grafting an unsaturated carboxylic acid onto an olefin.

Examples of olefin-based monomers include, but are not limited to, ethylene, propylene and 1-butene. These may be used alone, or two or more may be used in combination. Examples of monomers that are copolymerizable with olefin-based monomers include unsaturated carboxylic acids such as acrylic acid, maleic acid, maleic anhydride, methacrylic acid, vinylacetic acid, crotonic acid, isocrotonic acid, fumaric acid, itaconic acid, citraconic acid and mesaconic acid, any of which may be used alone or in combinations of two or more.

The copolymerization ratio of the olefin-based monomer and the monomer that is copolymerizable with the olefin-based monomer, is preferably 60 to 95 mass % of the olefin-based monomer and 5 to 40 mass % of the monomer that is copolymerizable with the olefin-based monomer, and more preferably 70 to 85 mass % of the olefin-based monomer and 15 to 30 mass % of the monomer that is copolymerizable with the olefin-based monomer, with the total mass of the copolymerization as 100 mass %. If the olefin-based monomer is 60 mass % or greater, affinity with the matrix will be satisfactory, and if the mass percentage of the olefin-based monomer is 95 mass % or lower, the water dispersibility of the modified polyolefin-based resin will be satisfactory and it will be easier to achieve uniform application on the continuous reinforcing fibers.

The modified polyolefin-based resin to be used as the binding agent may have the modified groups such as carboxyl groups, which have been introduced by copolymerization, neutralized with a basic compound. Examples of basic compounds include, but are not limited to, alkali compounds such as sodium hydroxide and potassium hydroxide; ammonia; and amines such as monoethanolamine and diethanolamine. The weight-average molecular weight of the modified polyolefin-based resin to be used as a binding agent is not particularly restricted, but it is preferably 5,000 to 200,000 and more preferably 50,000 to 150,000. It is preferably 5,000 or greater from the viewpoint of improved bundling of glass fibers, and preferably 200,000 or lower from the viewpoint of emulsified stability in water-dispersible form.

A modified polyamide-based resin to be used as a binding agent is a modified polyamide compound having a hydrophilic group such as a polyalkylene oxide chain or tertiary amine component introduced into the molecular chain, and it can be produced by a publicly known method.

When a polyalkylene oxide chain is to be introduced into the molecular chain, it is produced, for example, by copolymerization of a compound in which all or a portion of polyethylene glycol or polypropylene glycol has been modified to a diamine or dicarboxylic acid. For introduction of a tertiary amine component, it is produced by copolymerization of aminocthylpiperazine, bisaminopropylpiperazine or α-dimethylamino ε-caprolactam, for example.

A modified polyester-based resin to be used as a binding agent is a resin that is a copolymer of a polycarboxylic acid or its anhydride and a polyol, and that has a hydrophilic group in the molecular skeleton including the ends, and it can be produced by a publicly known method.

Examples of hydrophilic groups include polyalkylene oxides, sulfonic acid salts, carboxyl groups, and their neutral salts. Polycarboxylic acids and their anhydrides include aromatic dicarboxylic acids, sulfonic acid salt-containing aromatic dicarboxylic acids, aliphatic dicarboxylic acids, alicyclic dicarboxylic acids and trifunctional or greater polycarboxylic acids.

Examples of aromatic dicarboxylic acids include, but are not limited to, phthalic acid, terephthalic acid, isophthalic acid, orthophthalic acid, 1,5-naphthalenedicarboxylic acid, 2,6-naphthalenedicarboxylic acid and phthalic anhydride.

Examples of sulfonic acid salt-containing aromatic dicarboxylic acids include, but are not limited to, sulfoterephthalic acid salts, 5-sulfoisophthalic acid salts and 5-sulfoorthophthalic acid salts.

Examples of aliphatic dicarboxylic acids or alicyclic dicarboxylic acids include, but are not limited to, fumaric acid, maleic acid, itaconic acid, succinic acid, adipic acid, azelaic acid, sebacic acid, dimer acid, 1,4-cyclohexanedicarboxylic acid, succinic anhydride and maleic anhydride.

Examples of trifunctional or greater polycarboxylic acids include, but are not limited to, trimellitic acid, pyromellitic acid, trimellitic anhydride and pyromellitic anhydride.

From the viewpoint of increasing the heat resistance of the modified polyester-based resin, preferably 40 to 99 mol % of the total polycarboxylic acid component consists of aromatic dicarboxylic acids. From the viewpoint of emulsified stability when the modified polyester-based resin is in the form of an aqueous dispersion, preferably 1 to 10 mol % of the total polycarboxylic acid component is sulfonic acid salt-containing aromatic dicarboxylic acids.

The polyol forming the modified polyester-based resin may be a diol or a trifunctional or greater polyol.

Examples of diols include, but are not limited to, ethylene glycol, diethylene glycol, polyethylene glycol, propylene glycol, polypropylene glycol, polybutylene glycol, 1,3-propanediol, 1,4-butanediol, 1,6-hexanediol, neopentyl glycol, polytetramethylene glycol, 1,4-cyclohexanediol, 1,4-cyclohexanedimethanol, bisphenol A, and their alkylene oxide addition products. Trifunctional or greater polyols include trimethylolpropane, glycerin and pentaerythritol.

The copolymerization ratio of the polycarboxylic acid or its anhydride and the polyol forming the modified polyester-based resin is preferably 40 to 60 mass % of the polycarboxylic acid or its anhydride and 40 to 60 mass % of the polyol and more preferably 45 to 55 mass % of the polycarboxylic acid or its anhydride and 45 to 55 mass % of the polyol, with the total mass of the copolymerizing component as 100 mass %.

The weight-average molecular weight of the modified polyester-based resin is preferably 3,000 to 100,000 and more preferably 10,000 to 30,000. It is preferably 3,000 or greater from the viewpoint of improved bundling of the glass fibers, and preferably 100,000 or lower from the viewpoint of emulsified stability in water-dispersible form.

The polymer and thermoplastic resin used as the binding agent may be used alone, or two or more may be used in combination.

It is more preferred to use one or more polymers selected from among acrylic acid homopolymers, copolymers of acrylic acid and other copolymerizable monomers, and salts thereof with primary, secondary and tertiary amines, at 50 mass % or greater or 60 mass % or greater, with the entire amount of the binding agent as 100 mass %.

Composition of Sizing Agent for Glass Fibers

When glass fibers are used as the continuous reinforcing fibers, the sizing agent of the glass fibers preferably contains 0.1 to 2 mass % of a silane coupling agent, 0.01 to 1 mass % of a lubricating agent and 1 to 25 mass % of a binding agent, and preferably the components are diluted with water for adjustment of the total mass to 100 mass %.

The content of the silane coupling agent in the sizing agent for glass fibers is preferably 0.1 to 2 mass %, more preferably 0.1 to 1 mass % and even more preferably 0.2 to 0.5 mass %, from the viewpoint of improving bundling of the glass fibers, increasing the interfacial bonding strength and increasing the mechanical strength of the composite molded article.

From the viewpoint of imparting sufficient lubricity, the content of the lubricating agent in the sizing agent for glass fibers is preferably 0.01 mass % or greater and more preferably 0.02 mass % or greater, and from the viewpoint of increasing the interfacial bonding strength and increasing the mechanical strength of the composite molded article it is preferably 1 mass % or lower and more preferably 0.5 mass % or lower.

The content of the binding agent in the sizing agent for glass fibers is preferably 1 to 25 mass %, more preferably 3 to 15 mass % and even more preferably 3 to 10 mass %, from the viewpoint of controlling bundling of the glass fibers, increasing the interfacial bonding strength and increasing the mechanical strength of the composite molded article.

Usage of Sizing Agent for Glass Fibers

The sizing agent for glass fibers may be prepared into any form such as an aqueous solution, a colloidal dispersion or an emulsion using an emulsifier, depending on the usage, but it is preferably in the form of an aqueous solution from the viewpoint of increasing the dispersion stability of the sizing agent and increasing the heat resistance.

Glass fibers used as continuous reinforcing fibers in the continuous fiber-reinforced molded resin of the embodiment can be continuously obtained by drying glass fibers produced using a known method employing a roller-type applicator in a production process for known glass fibers, and applying the sizing agent to the glass fibers.

The sizing agent is applied at preferably 0.1 to 3 mass %, more preferably 0.2 to 2 mass % and even more preferably 0.2 to 1 mass %, as the total mass of the silane coupling agent, lubricating agent and binding agent, with respect to 100 mass % of the glass fibers.

From the viewpoint of controlling bundling of the glass fibers and increasing the interfacial bonding strength, the sizing agent coverage is preferably 0.1 mass % or greater, as the total mass of the silane coupling agent, lubricating agent and binding agent with respect to 100 mass % of the glass fibers, and it is also preferably 3 mass % or lower from the viewpoint of yarn handleability.

When carbon fibers have been selected as the continuous reinforcing fibers, the sizing agent preferably comprises a coupling agent, a lubricating agent and a binding agent. The types of sizing agent, lubricating agent and binding agent are not particularly restricted, and publicly known agents may be used. Specific materials that may be used include the materials mentioned in Japanese Unexamined Patent Publication No. 2015-101794. The coupling agent may be selected as one with good compatibility with the hydroxyl groups present on the surfaces of the carbon fibers, the binding agent may be selected as one having good wettability with and similar surface tension to the selected synthetic resin, and the lubricating agent may be selected as one that does not inhibit the coupling agent and binding agent.

When other continuous reinforcing fibers are used, the type and coverage of the sizing agent used on the glass fibers and carbon fibers may be selected as appropriate depending on the properties of the continuous reinforcing fibers, but the type and coverage of the sizing agent are preferably for a sizing agent used for carbon fibers.

Continuous Reinforcing Fiber Form

The continuous reinforcing fibers are preferably multifilaments composed of a plurality of reinforcing fibers, with the filament number preferably being 30 to 15,000, from the viewpoint of handleability. The monofilament diameter of the continuous reinforcing fibers is preferably 2 to 30 μm, more preferably 4 to 25 μm, even more preferably 6 to 20 μm and most preferably 8 to 18 μm, from the viewpoint of strength and manageability.

The product RD of the monofilament diameter R (μm) and the density D (g/cm$^3$) of the continuous reinforcing fibers is preferably 5 to 100 μm·g/cm$^3$, more preferably 10 to 50 μm·g/cm$^3$, even more preferably 15 to 45 μm·g/cm$^3$ and yet more preferably 20 to 45 μm·g/cm$^3$, from the viewpoint of composite yarn manageability and molded article strength.

The density D can be measured using a densitometer. The monofilament diameter (μm) can be calculated by the following formula:

$$\text{Monofilament diameter} = 20 \times \sqrt{(\text{fineness}/(\pi \times \text{number of filaments} \times \text{density}))}$$

based on the density (g/cm$^3$) and fineness (dtex), and the number of filaments.

To ensure that the product RD of the continuous reinforcing fibers is within the predetermined range, commercially available continuous reinforcing fibers may be used having the fineness (dtex) and number of filaments appropriately selected for the density of the continuous reinforcing fibers. For example, when glass fibers are used as the continuous reinforcing fibers, the density is about 2.5 g/cm$^3$, and therefore a monofilament diameter of 2 to 40 μm may be selected. More specifically, when the monofilament diameter of the glass fiber is 9 μm, glass fibers with a fineness of 660 dtex and a filament number of 400 may be selected, for a product RD of 23. When the monofilament diameter of the glass fibers is 17 μm, glass fibers with a fineness of 11,500 dtex and a filament number of 2,000 may be selected, for a product RD of 43. When carbon fibers are used as the continuous reinforcing fibers, the density is about 1.8 g/cm$^3$, and therefore a monofilament diameter of 2.8 to 55 μm may be selected. Specifically, when the monofilament diameter of the carbon fibers is 7 μm, carbon fibers with a fineness of 2,000 dtex and a filament number of 3,000 may be selected, for a product RD of 13. When aramid fibers are used as the continuous reinforcing fibers, the density is about 1.45 g/cm$^3$, and therefore a monofilament diameter of 3.4 to 68 μm may be selected. Specifically, when the monofilament diameter of the aramid fibers is 12 μm, aramid fibers with a fineness of 1,670 dtex and a filament number of 1,000 may be selected, for a product RD of 17.

Continuous reinforcing fibers, such as glass fibers, are produced by measuring and mixing raw glass and obtaining molten glass in a melting furnace, spinning it into a glass filament, coating it with a sizing agent, feeding it through a spinning machine, and winding it up as Direct Wind Roving (DWR), a cake, or twisted yarn. The continuous reinforcing fibers may be in any form, but are preferably wound up into a yarn, cake or DWR for increased productivity and production stability in the resin-coating step. DWR is most preferred from the viewpoint of productivity.

Synthetic Resin

The synthetic resin composing the matrix resin of the continuous fiber-reinforced molded resin of the embodiment may be a thermoplastic resin or a thermosetting resin, but it is preferably a thermoplastic resin from the viewpoint of the molding cycle and recycling properties.

Thermoplastic Resin

The thermoplastic resin composing the continuous fiber-reinforced molded resin of the embodiment may be of a single type or a combination of more than one type. It is preferred to use two or more thermoplastic resins from the viewpoint of adhesion with the continuous fiber-reinforced resin. When two or more thermoplastic resins are used, at the interface between a single continuous reinforcing fiber and a synthetic resin in a cross-section perpendicular to the lengthwise direction of the continuous reinforcing fiber, in a region of the outer peripheral edge separated from the perimeter of the continuous reinforcing fiber by 1/10 of the radius of a single continuous reinforcing fiber, the proportion of the two or more thermoplastic resins that is occupied by resin other than the resin with the highest occupying proportion of the entire resin region, is preferably higher than the proportion occupied by the resin with the highest occupying proportion of the entire resin region, from the viewpoint of productivity and of interfacial strength between the reinforcing fibers and the resin.

The thermoplastic resin has an absorption percentage of preferably 0.1 wt % or greater, more preferably 0.3 wt % or greater, even more preferably 0.5 wt % or greater, yet more preferably 0.8 wt % or greater, even yet more preferably 1.0 wt % or greater and most preferably 1.5 wt % or greater, from the viewpoint of reactivity between the coupling agent and the terminal functional groups of the thermoplastic resin. The absorption percentage of the thermoplastic resin can be measured using a Karl Fischer moisture analyzer.

A catalyst that promotes reaction between the coupling agent and the terminal functional groups of the thermoplastic resin may also be added to the thermoplastic resin, and when glass fibers are selected as the continuous reinforcing fibers and a polyamide resin is selected as the thermoplastic resin, for example, examples of such a catalyst include phosphoric compounds such as sodium hypophosphite, which promote bonding reaction between the amino groups of the silane coupling agent and the terminal carboxyl groups of the polyamide resin.

The content of the particulate additive in the thermoplastic resin is preferably 30 ppm or lower, but from the viewpoint of mechanical strength of the continuous fiber-reinforced resin composite material it is more preferably 20 ppm or lower, even more preferably 10 ppm or lower and most preferably 5 ppm or lower.

An example for the particulate additive in the thermoplastic resin is carbon black.

μ-Drop Formation Coefficient

The μ-drop formation coefficient is an index of compatibility between the resin and reinforcing fibers, the μ-drop formation coefficient affecting not only the main component of the resin but also affecting trace components in the resin. The thermoplastic resin preferably has a μ-drop formation coefficient of 10 or greater with the reinforcing fibers (assuming a number of touches of 4). The μ-drop formation coefficient can be calculated by the following formula, for example:

$$(\mu\text{-drop formation coefficient}) = \{(\text{number of } \mu\text{-drops formed}) / (\text{number of times resin touch reinforcing fibers})\} \times 10$$

after repeatedly touching the resin with the reinforcing fibers using a composite material boundary interface evaluator (HM410, product of Toci Sangyo Co., Ltd.) when the resin attaches to a single reinforcing fiber filament, and counting the number of μ-drops generated.

Two or More Thermoplastic Resins

The thermoplastic resin composing the matrix resin of the continuous fiber-reinforced molded resin of the embodiment may also consist of two or more types. Of the two or more thermoplastic resins, from the viewpoint of heat resistance, preferably the resin with the highest occupying proportion of the entire resin region (the primary resin) preferably accounts for 85% to 99% of the total area occupied by the two or more thermoplastic resins, while the resin with the highest occupying proportion of the entire resin region (the primary resin) of the two or more thermoplastic resins is the resin with the highest melting point.

The difference between the melting point of the resin with the highest melting point and the melting point of the resin with the lowest melting point of the two or more thermoplastic resins is preferably 35° C. or higher, and more preferably 100° C. or higher. The types of thermoplastic resins in the continuous fiber-reinforced molded resin can be identified by analyzing a cross-section of the continuous fiber-reinforced molded resin with a laser Raman microscope, and the melting point and glass transition temperature of each thermoplastic resin can be calculated from the composition of the resin, using a differential scanning calorimeter (DSC). From the viewpoint of heat resistance, the melting point of the thermoplastic resin mixture is preferably the same as the melting point of the resin with the highest occupying proportion of the entire resin region (the primary resin) in the thermoplastic resin.

The difference between the melting peak temperature during temperature increase and the crystallization peak temperature during temperature decrease for the mixture of the two or more thermoplastic resins forming the continuous fiber-reinforced molded resin of the embodiment is preferably smaller than the difference between the melting peak temperature during temperature increase and the crystallization peak temperature during temperature decrease of the resin with the highest occupying proportion of the entire resin region (primary resin), among the resins of the two or more thermoplastic resins, in order to obtain an excellent balance between moldability and impregnation rate. The melting peak temperature during temperature increase and the crystallization peak temperature during temperature decrease can be calculated by DSC.

Of the two or more thermoplastic resins forming the continuous fiber-reinforced molded resin of the embodiment, the bonding strength between at least one resin (secondary resin) other than the resin with the highest occupying proportion of the entire resin region (primary resin) and the continuous reinforcing fibers is preferably larger than the bonding strength between the resin with the highest occupying proportion of the entire resin region (primary resin) and the continuous reinforcing fibers, from the viewpoint of impregnating property and strength. The bonding strength between each thermoplastic resin and the continuous reinforcing fibers can be determined by a push-out test using a nanoindenter.

Of the two or more thermoplastic resins forming the continuous fiber-reinforced molded resin of the embodiment, the difference in surface tension between at least one resin (secondary resin) other than the resin with the highest occupying proportion of the entire resin region (primary resin) and the continuous reinforcing fibers is preferably larger than the difference in surface tension between the resin with the highest occupying proportion of the entire resin region (primary resin) and the continuous reinforcing fibers, from the viewpoint of impregnating property and strength. Of the two or more thermoplastic resins forming the continuous fiber-reinforced molded resin of the embodiment, the wettability of at least one resin (secondary resin) other than the resin with the highest occupying proportion of the entire resin region (primary resin) for the continuous reinforcing fibers is preferably greater than the wettability of the resin with the highest occupying proportion of the entire resin region (primary resin) for the continuous reinforcing fibers, from the viewpoint of impregnating property and strength. The difference in surface tension and the wettability between each of the thermoplastic resins and the continuous reinforcing fibers can be evaluated by embedding a single continuous reinforcing fiber in the thermoplastic resin melted on a hot plate, and determining the length to which the thermoplastic resin is pulled on the continuous fiber when the continuous reinforcing fiber has been pulled.

The melt viscosity of the mixture of the two or more thermoplastic resins forming the continuous fiber-reinforced molded resin of the embodiment is preferably the same as the melt viscosity of the resin with the highest occupying proportion of the entire resin region (primary resin) of the two or more thermoplastic resins, for an excellent balance between strength and impregnating property. The melt viscosity of the resin can be measured using a twin-capillary rheometer.

The two or more thermoplastic resins forming the continuous fiber-reinforced molded resin of the embodiment may be used in pre-compounded form, depending on the form of the intermediate material, or an intermediate material resin may be formed by dry blending.

Form of Thermoplastic Resin

The form of the thermoplastic resin is not particularly restricted, and it may be in the form of a film, pellets, fibers, a plate, powder or a reinforcing fiber coating.

Type of One or More Thermoplastic Resins

Examples of thermoplastic resins include, but are not limited to, polyolefin-based resins such as polyethylene and polypropylene; polyamide-based resins such as polyamide 6, polyamide 66 and polyamide 46; polyester-based resins such as polyethylene terephthalate, polybutylene terephthalate and polytrimethylene terephthalate; polyacetal-based resins such as polyoxymethylene; polycarbonate-based resins; polyether-based resins such as polyether ketone, polyether ether ketone, polyether glycol, polypropylene glycol and polytetramethylene ether glycol; polyether sulfones; polyphenylene sulfides; thermoplastic polyetherimides; thermoplastic fluorine-based resins such as tetrafluoroethylene-ethylene copolymers; polyurethane-based resins; and acrylic-based resins, as well as modified thermoplastic resins obtained by modifying any of the foregoing.

Of these thermoplastic resins, polyolefin-based resins, polyamide-based resins, polyester-based resins, polyether-based resins, polyether sulfones, polyphenylene sulfides, thermoplastic polyetherimides and thermoplastic fluorine-based resins are preferred, with polyolefin-based resins, modified polyolefin-based resins, polyamide-based resins, polyester-based resins, polyurethane-based resins and acrylic-based resins being more preferred from the viewpoint of mechanical properties and general utility, and polyamide-based resins and polyester-based resins being even more preferred when the viewpoint of thermal properties is also considered. Polyamide-based resins are even more preferred from the viewpoint of durability against repeated load.

Polyester-Based Resin

A polyester-based resin is a polymer compound having a —CO—O— (ester) bond in the main chain.

Polyester-based resins include, but are not limited to, polyethylene terephthalate, polybutylene terephthalate, polytetramethylene terephthalate, poly-1,4-cyclohexylenedimethylene terephthalate and polyethylene-2,6-naphthalene dicarboxylate.

A polyester-based resin may be a homopolyester or a copolymerized polyester.

In the case of a copolymerized polyester, a suitable third component is preferably copolymerized with a homopolyester, where examples for the third component include, but are not limited to, diol components such as diethylene glycol, neopentyl glycol and polyalkylene glycol, and dicarboxylic acid components such as adipic acid, sebacic acid, phthalic acid, isophthalic acid and 5-sodiumsulfoisophthalic acid.

A polyester-based resin employing a biomass resource-derived starting material may also be used, where examples include, but are not limited to, aliphatic polyester-based resins such as polylactic acid, polybutylene succinate and polybutylene succinate adipate, and aromatic polyester-based resins such as polybutylene adipate terephthalate.

Polyamide-Based Resin

A polyamide-based resin is a polymer compound having a —CO—NH— (amide) bond in the main chain. Examples includes aliphatic polyamides, aromatic polyamides and fully aromatic polyamides, with aliphatic polyamides being preferred from the viewpoint of high affinity with the reinforcing fibers and more easily obtaining a reinforcing effect with the reinforcing fibers.

The amount of carboxyl terminal groups in the polyamide resin is preferably 65 μmol/g or greater from the viewpoint of adhesion between the resin and the reinforcing fibers, and it is more preferably 70 μmol/g or greater, even more preferably 75 μmol/g or greater and yet more preferably 80 μmol/g or greater.

The amount of amino terminal groups in the polyamide resin is preferably 40 μmol/g or less from the viewpoint of adhesion between the resin and the reinforcing fibers, and it is more preferably 35 μmol/g or less, even more preferably 30 μmol/g or less and yet more preferably 25 μmol/g or less.

Examples of polyamide-based resins include, but are not limited to, polyamides obtained by ring-opening polymerization of lactams, polyamides obtained by self-condensation of ω-aminocarboxylic acids, polyamides obtained by condensation of diamines and dicarboxylic acids, and copolymers of the foregoing.

Such polyamide-based resins may be used alone, or two or more may be used in admixture.

Examples of lactams include, but are not limited to, pyrrolidone, caprolactam, undecanclactam and dodecalactam. Examples of ω-aminocarboxylic acids include, but are not limited to, ω-amino fatty acids that are lactam compounds having the rings opened with water. Two or more different lactam or ω-aminocarboxylic acid monomers may also be condensed together.

Examples of diamines (monomers) include, but are not limited to, straight-chain aliphatic diamines such as hexamethylenediamine or pentamethylenediamine; branched aliphatic diamines such as 2-methylpentanediamine or 2-ethylhexamethylenediamine; aromatic diamines such as p-phenylenediamine or m-phenylenediamine; and alicyclic diamines such as cyclohexanediamine, cyclopentanediamine or cyclooctanediamine.

Examples of dicarboxylic acids (monomers) include, but are not limited to, aliphatic dicarboxylic acids such as adipic acid, pimelic acid and sebacic acid; aromatic dicarboxylic acids such as phthalic acid and isophthalic acid; and alicyclic dicarboxylic acids such as cyclohexanedicarboxylic acid. A diamine and dicarboxylic acid as monomers may be condensed with either one each alone, or two or more in combination.

Examples of polyamide-based resins include, but are not limited to, polyamide 4 (poly α-pyrrolidone), polyamide 6 (polycaproamide), polyamide 11 (polyundecancamide), polyamide 12 (polydodecaneamide), polyamide 46 (polytetramethylene adipamide), polyamide 66 (polyhexamethylene adipamide), polyamide 610, polyamide 612, polyamide 6T (polyhexamethylene terephthalamide), polyamide 9T (polynonanemethylene terephthalamide) and polyamide 6I (polyhexamethylene isophthalamide), as well as copolymerized polyamides containing these as constituent components.

Examples of copolymerized polyamides include, but are not limited to, copolymers of hexamethylene adipamide and hexamethylene terephthalamide, copolymers of hexamethylene adipamide and hexamethylene isophthalamide, and copolymers of hexamethylene terephthalamide and 2-methylpentanediamine terephthalamide.

Method for Producing Shaped Molded Article From Continuous Fiber-Reinforced Composite Material A shaped molded article can be produced from the fiber-reinforced composite material by a method including a step in which the continuous fiber-reinforced resin composite material produced by the method described above is heated at above the melting point of the thermoplastic resin using an IR heater, for example, and pressed using a die, and then cooled to a temperature below the melting point of the thermoplastic resin and shaped.

Thermosetting Resin

Examples of thermosetting resins include, but are not limited to, epoxy resins, phenol resins, melamine resins, urea resins and unsaturated polyester resins. These thermosetting resins may be used alone or in combinations of two or more.

Uses of Continuous Fiber-Reinforced Molded Resin of the Embodiment (Composite Material)

The continuous fiber-reinforced molded resin of the embodiment can be suitably used in structural materials for aircraft, vehicles, construction materials, robots and communication device housings.

Examples of uses for vehicles include, but are not limited to, chassis/frames, suspensions, drive system components, interior parts, exterior parts, functional parts and other parts.

Specifically, suitable uses include use in a part for a steering axis, mount, sunroof, step, roof trimming, door trimming, trunk, boot lid, bonnet, sheet frame, sheet back, retractor, retractor support bracket, clutch, gear, pulley, cam, auger, elasticity beam, buff ring, lamp, reflector, glazing, front-end module, back door inner, brake pedal, handle, electrical material, sound-absorbing material, door exterior, interior finishing panel, instrument panel, rear gate, ceiling cover, sheet, seat framework, wiper strut, EPS (Electric Power Steering), small motor, heat sink, ECU (Engine Control Unit) box, ECU housing, steering gear box housing, plastic housing, EV (Electric Vehicle) motor housing, wire harness, in-vehicle meter, combination switch, small motor, spring, damper, wheel, wheel cover, frame, sub-frame, side frame, motorcycle frame, fuel tank, oil pan, intake manifold, propeller shaft, driving motor, monocoque, hydrogen tank, fuel cell electrode, panel, floor panel, outer plating panel, door, cabin, roof, hood, valve, EGR (Exhaust Gas Recirculation) valve, variable valve timing unit, connecting rod, cylinder bore, member (engine mounting, front floor cloth, footwell cloth, seat cloth, inner side, rear cloth, suspension, pillar lean force, front side, front panel, upper, dash panel cloth, steering), tunnel, fasten insert, crash box, crash rail, corrugate, roof rail, upper body, side rail, braiding, door surround assembly, airbag member, body pillar, dash two-pillar gusset, suspension tower, bumper, body pillar lower, front body pillar, reinforcement (instrument panel, rail, roof, front body pillar, roof rail, roof side rail, locker, door belt line, front floor under, front body pillar upper, front body pillar lower, center pillar, center pillar hinge, door outside panel), side outer panel, front door window frame, MICS (Minimum Intrusion Cabin System) bulk, torque box, radiator support, radiator fan, water pump, fuel pump, electronic control throttle body, engine control ECU, starter, alternator, manifold, transmission, clutch, dash panel, dash panel insulator pad, door side impact protection beam, bumper beam, door beam, bulkhead, outer pad, inner pad, rear seat rod, door panel, door trimming board subassembly, energy absorber (bumper, shock absorption), shock absorbing body, shock absorption garnish, pillar garnish, roof side inner garnish, resin rib, side rail front spacer, side rail rear spacer, seat belt pretensioner, air bag sensor, arm (suspension, lower, hood hinge), suspension link, shock absorption bracket, fender bracket, inverter bracket, inverter module, hood inner panel, hood panel, cowl louver, cowl top outer front panel, cowl top outer panel, floor silencer, dump sheet, hood insulator, fender side panel protector, cowl insulator, cowl top ventilator looper, cylinder head cover, tire deflector, fender support, strut tower bar, mission center tunnel, floor tunnel, radio core support, luggage panel, luggage floor, accelerator pedal or accelerator pedal base.

The continuous fiber-reinforced molded resin of the embodiment (composite material) may be in a rectangular solid shape, for example, for communication device housing purposes.

The properties of a housing, being a member that requires electromagnetic wave transparency, is an electric field shielding property of preferably lower than 10 dB, more preferably lower than 5 dB and even more preferably lower than 0.1 dB in the frequency band of 1 GHz, as measured by the KEC method. Continuous tempered glass fibers may be used as the continuous reinforcing fibers with this property.

The average wall thickness of the housing is preferably 1 mm or smaller, more preferably 0.5 mm or smaller and most preferably 0.4 mm or smaller. For example, a housing of the desired thickness, having low disorder of the continuous fibers and no generation of voids, can be produced via a preform.

EXAMPLES

The present invention will now be explained in greater detail by Examples and Comparative Examples, with the implicit understanding that the invention is not limited to the Examples, and various modifications may be implemented such as are within the gist of the scope thereof.

The measuring methods used in the Examples and Comparative Examples will be explained first.

Average Void Percentage of Region of 1/10 of the Radius of the Single Continuous Reinforcing Fiber from the Edge of the Single Continuous Reinforcing Fiber The continuous fiber-reinforced molded resin was cut with a band saw, and the cut test piece was polished using a polishing machine (IS-POLISHER ISPP-1000 compact precision material fabrication system (Ikegami Seiki Co., Ltd.)), with a pressure of 400 g/cm$^2$ on the polishing surface. The polishing was carried out for 10 minutes with #220 waterproof paper, 2 minutes with #400 waterproof paper, 5 minutes with #800 waterproof paper, 10 minutes with #1200 waterproof paper, 15 minutes with #2000 waterproof paper, 15 minutes with 9 μm silicon carbide film particles, 15 minutes with 5 μm alumina film particles, 15 minutes with 3 μm alumina film particles, 15 minutes with 1 μm alumina film particles, and 10 minutes with 0.1 μm colloidal silica particles (BAIKALOX 0.1CR) with buffing paper foamed polyurethane, at approximately 7 mL/min while adding water. The polished sample was observed with an SEM (S-4700, by Hitachi High-Technologies Corp.), and the void percentage in the region of 1/10 of the radius of the single continuous reinforcing fiber was calculated from the obtained image. Upon observing 100 arbitrarily selected continuous reinforcing fibers, the average void percentage in the region of 1/10 of the radius of the single continuous reinforcing fiber, and the proportion with a void percentage of 10% or lower, were calculated.

Impregnation Rate

A cross-section was cut from the molded article and embedded in an epoxy resin, and it was then polished while taking care not to damage the continuous reinforcing fibers. Upon observation under a microscope, the areas occupied by the continuous reinforcing fiber bundle, synthetic resin and voids were each determined from the image, and the void area percentage with respect to the continuous reinforcing fiber bundle (total) area was determined by calculation using the following formula:

$$\text{Impregnation rate}(\%) = \{1-(\text{void area/continous reinforcing fiber bundle area})\}\times 100.$$

Tensile Stress

A test strip with a length of 70 mm, a width of 10 mm and a wall thickness of 2 mm was cut out from the molded article, and the tensile stress (MPa) of the test piece was measured using an Instron universal testing machine at a speed of 5 mm/min, with chucking at a spacing of 30 mm in the lengthwise direction, in a thermostatic bath with an environment of 23° C., 50% RH, and 150° C., 50%.

Flexural Stress and Flexural Modulus

A test strip with a length of 100 mm, a width of 10 mm and a wall thickness of 2 mm was cut out from the molded article, and a 3-point bending jig was used to measure the flexural stress (MPa) and flexural modulus (GPa) with an Instron universal testing machine, with the span set to 32 mm, at a speed of 1 mm/min and in an environment of 23° C., 50% RH.

Measurement of Volume Ratio (Vf) of Reinforcing Fibers in Continuous Fiber-Reinforced Resin and Quantity Ratio of Resin Leaked During Molding A 2 g portion was cut out of the continuous fiber-reinforced molded resin, and was placed in an electric furnace and heated at 650° C. for 3 hours to burn off the resin. It was then allowed to naturally cool to room temperature, and the mass of the remaining glass fibers was measured to determine the proportion of glass fibers and resin in the continuous fiber-reinforced molded resin. Using the calculated proportion, it was divided by the density to determine the volume ratio (Vf) of reinforcing fibers with respect to the continuous fiber-reinforced molded resin. The amount of resin leaked during molding was determined from the amount of charged resin and the amount of resin in the continuous fiber-reinforced molded resin after molding, and the amount of leaked resin was divided by the amount of charged resin to calculate the quantity ratio of leaked resin.

Type and Occupying Ratio of Each Thermoplastic Resin of Two or More Fiber-Reinforced Resins A cross-section of the continuous fiber-reinforced molded resin in the thickness direction (cross-section perpendicular to the lengthwise direction of the continuous reinforcing fibers) was cut out at each of 5 arbitrary locations, embedded in an epoxy resin, and polished while taking care that the continuous reinforcing fibers were not damaged.

A mapping image of the cross-section was taken using a laser Raman microscope (in ViaQontor confocal Raman microscope, product of Renishaw Co.), and the types of resins of the fiber-reinforced resins were identified from the obtained image and spectrum. Each area was also calculated by image processing using ImageJ, and the occupying ratio of the resin in the region of 1/10 of the radius of a single continuous reinforcing fiber from the edge of the single continuous reinforcing fiber (the area ratio) was calculated. The area ratio for each resin occupying the region of 1/10 of the radius of the single continuous reinforcing fiber was calculated for 10 arbitrary continuous reinforcing fibers in the cross-section, and the average was calculated.

Distribution of Thermoplastic Resin in Resin Regions Other than Interface Region of Fiber-Reinforced Molded Resin The continuous fiber-reinforced molded resin was polished with a polishing machine (IS-POLISHER ISPP-1000 compact precision material fabrication system, Ikegami Seiki Co., Ltd.), with a force of 125 g/cm$^2$ on the polished surface. The polishing was carried out for 10 minutes with #220 waterproof paper, 10 minutes with #1200 waterproof paper, 5 minutes with #2000 waterproof paper, 10 minutes with 9 μm silicon carbide film particles, 10 minutes with 5 μm alumina film particles, 5 minutes with 3 μm alumina film particles, 5 minutes with 1 μm alumina film particles, and 5 minutes with 0.1 μm colloidal silica particles (BAIKALOX 0.1CR) with buffing paper foamed polyurethane, at approximately 7 mL/min while adding water. The polished sample was subjected to electron staining by immersion for 18 hours in a 5 wt % aqueous solution of 12 tungsten(VI)phosphate n-hydrate, while taking care not to allow collapse of the polished surface. After drying, the distribution of the thermoplastic resin at 50 μm×50 μm portions at 5 arbitrary locations was observed using a SEM (S-4700, Hitachi High-Technologies Corp.), and the area of each was calculated by image processing using imageJ.

Based on the distribution it was assessed whether each specific resin was evenly dispersed or mixed in the resin regions other than the interface region.

Method of Measuring Loss Tangent of Continuous Fiber-Reinforced Molded Resin A continuous fiber-reinforced molded resin with a 2 mm thickness was cut with a band saw to a width of 5 mm and a length of 60 mm in the 0° and 90° directions with respect to the fiber direction, and a dynamic viscoelasticity measuring apparatus (AresG2, TA Instruments) was used for measurement, under a nitrogen atmosphere, in a measuring temperature range of 30° C. to 250° C. at a temperature-elevating rate of 5.0° C./min, with an angular frequency of 10 rad/s and with the deformation mode in twisting mode. The value of the loss tangent and its temperature were obtained from the peak top value of the graph plotting the loss tangent at each temperature, and from its associated temperature. The value of the loss tangent was used as the peak top at the low-temperature end.

Surface Impact Test

A test piece with a length of 60 mm, a width of 60 mm and a wall thickness of 2 mm was cut out from the molded article and tested with a high-speed impact tester (Shimadzu HYDRO SHOT HITS-P10, Shimadzu Corp.) according to JIS K7211-2; 2006, using a striker diameter of 20 mmφ, a receiver diameter of 40 mmφ, a test speed of 4.4 m/sec, a testing temperature of 23° C. and a testing number of n=5. A graph of test force with respect to displacement was drawn, and the integral value until maximum impact force was reached was calculated, recording the average value of 5 samples as the shock absorption energy.

Method of Measuring Storage Modulus of Continuous Fiber-Reinforced Molded Resin in Twisting Mode A continuous fiber-reinforced molded resin with a 2 mm thickness was cut with a band saw to a width of 5 mm and a length of 60 mm in the 0° and 90° directions or in a 45° direction (diagonal direction) with respect to the fiber direction, and a dynamic viscoelasticity measuring apparatus (AresG2, TA Instruments) was used for measurement, under a nitrogen atmosphere, in a measuring temperature range of 30° C. to 250° C. at a temperature-elevating rate of 5.0° C./min, with an angular frequency of 10 rad/s and with the deformation mode in twisting mode. The value of the storage modulus and its temperature were obtained from the peak top value of the graph plotting the storage modulus at each temperature, and from its associated temperature.

Surface Impact Test

A test piece with a length of 60 mm, a width of 60 mm and a wall thickness of 2 mm was cut out from the molded article and tested with a high-speed impact tester (Shimadzu HYDRO SHOT HITS-P10, Shimadzu Corp.) according to JIS K7211-2; 2006, using a striker diameter of 20 mmφ, a receiver diameter of 40 mmφ, a test speed of 4.4 m/sec, a testing temperature of 23° C. and a testing number of n=5. A graph of test force with respect to displacement was drawn, and the maximum impact strength was calculated as the average value of 5 samples.

Method of Measuring Bending Storage Modulus of Continuous Fiber-Reinforced Molded Resin A continuous fiber-reinforced molded resin with a 2 mm thickness was cut with a band saw to a width of 5 mm and a length of 60 mm in the 0° and 90° directions or in a 45° direction (diagonal direction) with respect to the fiber direction, and a dynamic viscoelasticity measuring apparatus (EPLEXOR-500N, ITS Japan, Inc.) was used for measurement, under a nitrogen atmosphere, in a measuring temperature range of 25° C. to 250° C. at a temperature-elevating rate of 3.0° C./min, with an oscillation frequency of 8 Hz and with the deformation mode in bending mode, recording the maximum value as the bending storage modulus. The storage modulus was obtained at different temperatures.

Method of Measuring Tensile Storage Modulus and Loss Tangent of Continuous Fiber-Reinforced Molded Resin A continuous fiber-reinforced molded resin with a 2 mm thickness was cut with a band saw to a width of 5 mm and a length of 60 mm in the 0° and 90° directions with respect to the fiber direction, and a dynamic viscoelasticity measuring apparatus (EPLEXOR-500N, ITS Japan, Inc.) was used for measurement, under a nitrogen atmosphere, in a measuring temperature range of 20° C. to 250° C. at a temperature-elevating rate of 3.0° C./min, with an oscillation frequency of 8 Hz and with the deformation mode in tension mode, obtaining the storage modulus at different temperatures. The maximum value between 20° C. and 200° C. in the plot of the loss tangent at different temperatures was recorded as the tensile loss tangent.

Method of Measuring Melting Point and Crystallization Temperature During Temperature Decrease for Thermoplastic Resin Using a DSC-60 by Shimadzu Corp., with a sample amount of approximately 5 mg, a mixture of two or more thermoplastic resins, or each one separately, was heated with atmospheric gas flowing at 30 mL/min and temperature increase of 10° C./min, from room temperature (25° C.) to above the expected melting point, to melting, after which the molten polyamide resin was cooled at 10° C./min, and the crystallization temperature was recorded as the peak top temperature among the observed exothermic peaks. Next, the temperature was raised again at a speed of 10° C./min to above the melting point, and the melting point was recorded as the peak top among the observed endothermic peaks.

Measurement of Bonding Strength Between Reinforcing Fibers and Each Thermoplastic Resin The continuous fiber-reinforced molded resin was cut to a thickness of 30 μm as a cross-section perpendicular to the lengthwise direction of the continuous reinforcing fibers, and polished while taking care that the continuous reinforcing fibers were not damaged. Using the polished sample, the reinforcing fibers were extruded out using a nanoindenter (iMicro, Nanomechenics, Inc.) to measure the bonding strength between the reinforcing fibers and the thermoplastic resin. The assessment was "G" when the bonding strength between the reinforcing fibers and the resin (secondary resin) other than the resin with the highest occupying proportion of the entire resin region (primary resin), among the thermoplastic resins, was stronger than the bonding strength between the reinforcing fibers and the resin with the highest occupying proportion of the entire resin region (primary resin), and "P" when it was weaker.

Measurement of Wettability and Surface Tension

A single continuous reinforcing fiber was embedded in the thermoplastic resin melted on a hot plate that had been heated to 280° C., a 1 mm continuous reinforcing fiber was pulled at 1 mm/sec while observing it under a microscope, and the length to which the thermoplastic resin was pulled by the continuous fiber during that time was assessed. The wettability and surface tension were assessed as "G" when the length to which the resin (secondary resin) other than the resin with the highest occupying proportion of the entire resin region (primary resin), among the thermoplastic resins, was pulled by the reinforcing fibers was greater than the length to which the resin with the highest occupying proportion of the entire resin region (primary resin), among the thermoplastic resins, was pulled by the reinforcing fibers, and "P" when it was less.

Measurement of Resin Melt Viscosity

Measurement was performed using a twin-capillary rheometer (Rosand Precision) at 280° C., varying the shear rate to 100/s, 200/s, 400/s, 1000/s, 2000/s, 4000/s and 8000/s. For a shear rate of 4000/s, an assessment of "G" was assigned when the melt viscosity of the mixture of two or more thermoplastic resins was 4/5 to 5/4 times the viscosity of the resin with the highest occupying proportion of the entire resin region, among the two or more thermoplastic resins, and an assessment of "P" was assigned otherwise.

Measurement of Absorption Percentage of Thermoplastic Resin

A Karl Fischer moisture analyzer (MKC610 by Kyoto Electronics Co., Ltd.) was used to weigh out and measure 0.3 g of thermoplastic resin under a nitrogen atmosphere.

Measurement of Flow Rate During Hot Pressing of Thermoplastic Resin

This was determined by measuring the weight of the resin that leaked out during molding and dividing it by the original thermoplastic resin weight.

Measurement of Volume Ratio of Reinforcing Fibers of Continuous Fiber-Reinforced Resin Composite Material A 2 g portion was cut out of the continuous fiber-reinforced resin composite material, and was placed in an electric furnace and heated at 650° C. for 3 hours to burn off the resin. It was then allowed to naturally cool to room temperature, and the mass of the remaining glass fibers was measured to determine the proportion of glass fibers and resin in the continuous fiber-reinforced resin composite material. Using the calculated proportion, it was divided by the density to determine the volume ratio (Vf) of reinforcing fibers with respect to the continuous fiber-reinforced resin composite material.

Measurement of Proportion of Sizing Agent Diffused Into Thermoplastic Resin

After immersing 1 g of the continuous fiber-reinforced resin composite material and 1 g of the continuous reinforcing fibers in 20 mL of hexafluoroisopropanol (HFIP), the mixture was stirred for 5 hours with a stirring roller to dissolve the thermoplastic resin. The undissolved portion was washed twice with HFIP, again immersed in HFIP, and stirred for 5 hours with a stirring roller. The undissolved portion was washed twice with HFIP and vacuum dried, and then an XPS (VersaProbe II, product of Ulvac-Phi, Inc.) was used for measurement with an excitation source of mono.AlKα20 kV×5 mA 100 W, an analysis size of 100 μmμ1.4 mm, and with a photoelectron take-off angle.

Measurement of Terminal Functional Group Amount

After dissolving 15 mg of a sample in 1.5 mg of $D_2SO_4$, $^1$H-NMR (JEOL-ECZ500) measurement was performed at room temperature.

Measurement by Acoustic Emission (AE) Method

Acoustic emission measurement was carried out using a continuous fiber-reinforced resin composite material cut out to a thickness of 2.0 mm, a length of 14 mm (7× the thickness) and a width of 10 mm, in an interlaminar shear test (JIS K7078) in which an AE sensor (AE-900 M) was mounted, with 10 mm between spans (5× the thickness) and with the test speed set to 1 mm/min. Analysis was performed with the preamp set to 34 dB, the threshold value to 30 dB and the filter to 95 kHz-960 kHz, defining an AE signal with an AE amplitude of lower than 50 dB and an AE signal duration of shorter than 1000 μs as corresponding to resin damage, an AE signal with an AE amplitude of 60 dB or higher and an AE signal duration of 1000 μs or longer as corresponding to interlayer separation, and an AE signal with an AE amplitude of 50 dB or higher and an AE signal duration of shorter than 1000 μs as corresponding to glass fiber damage.

Measurement of μ-Drop Formation Coefficient

The μ-drop formation coefficient was measured using a composite material boundary interface property evaluator (HM410 by Toci Sangyo Co., Ltd.), with the resin set in the heating furnace unit and the furnace temperature set to 40° C. below the melting point of the resin, adhering the resin to each of the individual reinforcing fibers set in the evaluator. When the resin was unmelted and could not adhere onto the reinforcing fiber, the furnace temperature was increased 10° C. at a time until the resin melted to adhere the resin onto the reinforcing fiber. The resin fused onto the reinforcing fiber was touched 4 times to adhere the resin and then allowed to stand for 1 minute, the number of μ-drops generated was counted, and calculation was performed using the following formula:

$$(\mu\text{-drop formation coefficient}) = \{(\text{number of } \mu\text{-drops generated}/4\}\times 10$$

Vibration Fatigue Test

A tensile impact dumbbell TypeS test piece conforming to ASTM-D1822 was prepared, and the test was conducted with an EHF-EB50KN-40L (RV) (product of Shimadzu Corp.), using a testing temperature of 23° C., a frequency of 20 Hz, a sine wave waveform, a chuck distance of 35 mm and a minimum load set to 10% load.

Continuous Reinforcing Fibers

[Glass Fibers (A)]

Glass fibers were produced in a filament number of 2000, with a fineness of 11,500 dtex and with 0.45 mass % adhesion of the sizing agent. The winding form was DWR and the mean monofilament diameter was 17 μm.

The glass fiber sizing agent was produced by copolymerizing 0.5 mass % of γ-aminopropyltriethoxysilane (aminosilane) KBE-903 (product of Shin-Etsu Chemical Co., Ltd.), 1 mass % of carnauba wax, 2 mass % of polyurethane resin Y65-55 (product of Adeka Corp.), 40 mass % of maleic anhydride, 50 mass % of methyl acrylate and 10 mass % of methyl methacrylate, and using deionized water for adjustment to 3 mass % of a copolymer compound with a weight-average molecular weight of 20,000 and 3 mass % of the copolymer compound aqueous solution.

[Glass Fibers B]

Glass fibers were produced in the same manner as glass fibers (A), except for using a fineness of 2900 dtex, a filament number of 800 and a mean monofilament diameter of 13 μm.

[Glass Fibers C]

ER1200T-423 (Nippon Electric Glass Co., Ltd.)

Thermoplastic Resin

Polyamide resin A: Polyamide 66 (LEONA 1300S (Asahi Kasei Corp.)), having a melting point of 265° C., a difference between melting peak temperature and crystallization peak temperature during temperature decrease (Tm−Tc) of 53° C., a number of carboxyl terminal groups of 70 μmol/g and an amino terminal group content of 32 μmol/g (Example 6-).

Polyamide resin B: Polyamide 6/12 (GRILON C CF6S (EMS-Chemie, Japan), melting point: 130° C.

Polyamide resin C: Polyamide 66 (LEONA 1402S (Asahi Kasei Corp.))

or

Polyamide 6 (Examples 4-, 5-): GRILON BS/2 Natural (EMS-Chemie, Japan), melting point: 225° C.

Polyamide 6I (Example 5-): LEONA R16024 (Asahi Kasei Corp.), glass transition temperature: 130° C.

Polyamide 6T/6I (Example 5-): Trial product by Toyobo, Ltd.

Polyethylene (PE) (Example 5-): SANTECH J240 (Asahi Kasei Corp.), melting point: 125° C.

Polyamide Film

The thermoplastic resins A and/or B were molded with a T-die extruder (product of Soken Co., Ltd.) to obtain a film. The thickness of the film was 100 μm.

Glass Cloth, Carbon Fiber Fabric

A rapier loom (weaving width: 2 m) was used for weaving using the glass fibers as the warp yarn and weft yarn, to produce a glass cloth. The woven form of the obtained glass cloth was a plain weave, the woven density was 6.5/25 mm and the basis weight was 600 g/m$^2$.

Glass cloth (Example 5-): WFR 350 100BS6 (Nittobo Co., Ltd.)

Carbon fiber fabric: (Example 5-): Carbon fibers in a filament number of 12,000 with a fineness of 8000 dtex, and having polyvinylpyrrolidone adhering at 2.8 mass %, were produced and used for weaving (plain weaving) with a rapier loom.

Particulate Additive

A master batch containing carbon black (Asahi Kasei Corp.) was used as a particulate additive. The carbon black content was 3 wt %.

Production of Continuous Fiber-Reinforced Molded Resin

The molding machine used was a hydraulic molding machine (Shoji Co.) with a maximum mold clamping force of 50 tons. A die with an inlay structure was prepared to obtain a flat continuous fiber-reinforced molded resin (200 mm length, 100 mm width, 2 mm wall thickness).

The glass cloth and polyamide film were cut to the die shape, layered in the prescribed number, and set in the die.

The internal temperature of the molding machine was raised to 330° C., and then the mold was clamped with a mold clamping force of 5 MPa for compression molding. The molding time was 1 minute after reaching 265° C. as the melting point of polyamide 66, and after quenching of the die, it was released and the molded article was removed. The maximum temperature during molding was 275° C.

Production With Double Belt Press Apparatus

A double belt press apparatus (process system) was used as the molding machine. Five glass cloths and 10 polyamide films were fed out from rolls. The device heater temperature was 330° C., and cooling was by water-cooling. Pressurization was at a pressure of 30 kN, and transport was at 0.2 m/min.

Example 1-1

Six glass cloths and seven polyamide resin A films were stacked and molded. The molding time was 1 minute after reaching 265° C. as the melting point of polyamide 66, and after quenching of the die, it was released and the molded article was removed. The maximum temperature during molding was 285° C.

Example 1-2

Six glass cloths and seven polyamide resin A films were stacked and molded. The temperature in the molding machine was set to 300° C., the molding time was 15 minutes after reaching 265° C. as the melting point of polyamide 66, and after quenching of the die, it was released and the molded article was removed. The maximum temperature during molding was 300° C.

Example 1-3

A continuous fiber-reinforced molded resin was obtained in the same manner as Example 1-1, except that molding was for 30 seconds after reaching 265° C. The maximum temperature during molding was 280° C.

Example 1-4

A continuous fiber-reinforced molded resin was obtained in the same manner as Example 1-1, except that the polyamide film consisted of a dry blend of polyamide resin A and polyamide resin B (A:B=8:1).

Example 1-5

A continuous fiber-reinforced molded resin was obtained in the same manner as Example 1-2, except that an epoxy resin was used instead of the polyamide resin A film.

A glass cloth was produced using the glass fibers, after adhering 0.3 mass % of 3-glycidoxypropyltrimethoxysilane (KBM-402, Shin-Etsu Chemical Co., Ltd.), 1.5 mass % of an epoxy resin emulsion and 0.2 mass % of carnauba wax, as the sizing agent. Six of the glass cloths were layered and set in a die, 16 g of a bisphenol A-type liquid epoxy resin (jER828 by Mitsubishi Chemical Corp.) and 1.6 g of bisphenol A (4,4'-(propane-2,2-diyl)diphenol were loaded in, and the temperature inside the molding machine was set to 40° C. for compression molding for 3 days at a mold clamping pressure of 5 MPa, to obtain a continuous fiber-reinforced molded resin.

Example 1-6

A continuous fiber-reinforced molded resin was obtained in the same manner as Example 1-1, except that the number of glass cloths was 5, and the number of polyamide resin A films was 10.

Comparative Example 1-1

A continuous fiber-reinforced molded resin was obtained in the same manner as Example 1-1, except that glass fibers without addition of a sizing agent were used.

Comparative Example 1-2

A continuous fiber-reinforced molded resin was obtained in the same manner as Example 1-1, except that the glass fibers used were adhered with a sizing agent that was 0.3 mass % of 3-glycidoxypropyltrimethoxysilane as a silane coupling agent, 1.5 mass % of an epoxy resin emulsion and 0.2 mass % of carnauba wax.

Comparative Example 1-3

Evaluation was conducted in the same manner as Example 1-1, for "Tepex Dynalite 101" by Bond Laminate Co. comprising a glass cloth impregnated with polyamide 66.

Comparative Example 1-6

A continuous fiber-reinforced molded resin was obtained in the same manner as Example 1-2, except that molding was with the internal temperature of the molding machine set to 265° C. The maximum temperature during molding was 265° C.

TABLE 1

| | Mean void percentage (%) | Percentage (%) | Tensile stress (MPa) | Flexural stress (MPa) | Flexural modulus (GPa) | Impregnation rate (%) | Vf (%) | Leaked resin quantity ratio (%) |
|---|---|---|---|---|---|---|---|---|
| Example 1-1 | 0.5 | 87 | 649 | 950 | 36 | 100 | 65 | 0.1 |
| Example 1-2 | 0.2 | 91 | 654 | 960 | 40 | 100 | 65 | 0.3 |
| Example 1-3 | 2 | 60 | 620 | 850 | 33 | 99 | 65 | 0.1 |
| Example 1-4 | 0.1 | 98 | 680 | 970 | 44 | 100 | 65 | 0.1 |
| Example 1-5 | 4 | 30 | 580 | 830 | 30 | 98 | 65 | 0.1 |
| Example 1-6 | 0.5 | 90 | 580 | 930 | 30 | 100 | 50 | 0.1 |
| Comparative Example 1-1 | 50 | 2 | 180 | 300 | 12 | 85 | 65 | 0.1 |
| Comparative Example 1-2 | 30 | 5 | 350 | 400 | 18 | 90 | 65 | 0.1 |
| Comparative Example 1-3 | 25 | 8 | 380 | 560 | 23 | 100 | 47 | |
| Comparative Example 1-6 | 30 | 8 | 440 | 530 | 23 | 97 | 65 | 0.3 |

Based on Table 1, the continuous fiber-reinforced molded resins of Examples 1-1 to 1-6 exhibited very high tensile stress, flexural stress and flexural moduli, because they were continuous fiber-reinforced resins in which at least 10% had a void percentage in the region of 1/10 of the radius of a single continuous reinforcing fiber from the edge of the single continuous reinforcing fiber that was 10% or lower. Their physical properties were much more satisfactory than the physical properties of a molded article obtained using the commercially available intermediate material of Comparative Example 1-3.

When using continuous reinforcing fibers that were not coated with a sizing agent or continuous reinforcing fibers coated with a sizing agent having poor compatibility with the resin, as in Comparative Examples 1-1 and 1-2, the void percentage was larger than 10% and the tensile stress, flexural stress and flexural modulus were reduced.

When the molding temperature was low, as in Comparative Example 1-6, the void percentage was larger than 10% and the tensile stress, flexural stress and flexural modulus were reduced.

Example 2-1

Six glass cloths and seven polyamide resin A films were stacked and molded. The molding time was 1 minute after reaching 265° C. as the melting point of polyamide 66, and after quenching of the die, it was released and the molded article was removed. The maximum temperature during molding was 285° C.

Example 2-2

Six glass cloths and seven polyamide resin A films were stacked and molded. The temperature in the molding machine was set to 300° C., the molding time was 10 minutes after reaching 265° C. as the melting point of polyamide 66, and after quenching of the die, it was released and the molded article was removed. The maximum temperature during molding was 300° C.

Example 2-3

A continuous fiber-reinforced molded resin was obtained in the same manner as Example 2-1, except that molding was for 30 seconds after reaching 265° C. The maximum temperature during molding was 280° C.

Example 2-4

A continuous fiber-reinforced molded resin was obtained in the same manner as Example 2-1, except that the polyamide film was a film of polyamide resin B.

Example 2-5

A continuous fiber-reinforced molded resin was obtained in the same manner as Example 2-1, except that the number of glass cloths was 5, and the number of polyamide resin A films was 10.

Example 2-6

A continuous fiber-reinforced molded resin was obtained in the same manner as Example 2-2, except that the number of glass cloths was 5, and the number of polyamide resin A films was 10.

Comparative Example 2-1

A continuous fiber-reinforced molded resin was obtained in the same manner as Example 2-1, except that glass fibers without addition of a sizing agent were used.

Comparative Example 2-2

A continuous fiber-reinforced molded resin was obtained in the same manner as Example 2-6, except that the glass fibers used were adhered with a sizing agent that was 0.3 mass % of 3-glycidoxypropyltrimethoxysilane as a silane coupling agent, 1.5 mass % of an epoxy resin emulsion and 0.2 mass % of carnauba wax.

Comparative Example 2-3

Evaluation was conducted in the same manner as Example 2-1, for "Tepex Dynalite 101" by Bond Laminate Co. comprising a glass cloth impregnated with polyamide 66.

TABLE 2

| | Loss tangent | Loss tangent peak temperature 1 (° C.) | Loss tangent peak temperature 2 (° C.) | Number of peaks | Peak temperature difference (° C.) | Shock absorption energy (J) | Vf (%) | Leaked resin quantity ratio (%) |
|---|---|---|---|---|---|---|---|---|
| Example 2-1 | 0.072 | 103 | | 1 | | 26.21 | 65 | 0.1 |
| Example 2-2 | 0.074 | 103 | | 1 | | 27.17 | 65 | 0.3 |
| Example 2-3 | 0.090 | 91 | | 1 | | 25.40 | 65 | 0.1 |
| Example 2-4 | 0.091 | 87 | | 1 | | 23.3 | 65 | 0.1 |
| Example 2-5 | 0.087 | 84 | 103 | 2 | 19 | 24.50 | 50 | 0.1 |
| Example 2-6 | 0.086 | 84 | 106 | 2 | 22 | 25.98 | 50 | 0.1 |
| Comparative Example 2-1 | 0.15 | 53 | | 1 | | 10.02 | 65 | 0.1 |
| Comparative Example 2-2 | 0.13 | 75 | 150 | 2 | 75 | 15.90 | 50 | 0.1 |
| Comparative Example 2-3 | 0.12 | 77 | 167 | 2 | 90 | 16.08 | 50 | |

Based on Table 2, the continuous fiber-reinforced molded resins of Examples 2-1 to 2-6 exhibited very high shock absorption energy, because the loss tangent in twisting mode was 0.11 or lower. Their physical properties were much more satisfactory than the physical properties of a molded article obtained using the commercially available intermediate material of Comparative Example 2-3.

When the loss tangent was high, as in the Comparative Examples, the shock absorption energy was reduced.

Example 3-1

Six glass cloths and seven polyamide resin A films were stacked and molded. The molding time was 1 minute after reaching 265° C. as the melting point of polyamide 66, and after quenching of the die, it was released and the molded article was removed. The maximum temperature during molding was 285° C.

Example 3-2

Six glass cloths and seven polyamide resin A films were stacked and molded. The temperature in the molding machine was set to 300° C., the molding time was 10 minutes after reaching 265° C. as the melting point of polyamide 66, and after quenching of the die, it was released and the molded article was removed. The maximum temperature during molding was 300° C.

Example 3-3

A continuous fiber-reinforced molded resin was obtained in the same manner as Example 3-1, except that molding was for 30 seconds after reaching 265° C. The maximum temperature during molding was 280° C.

Example 3-4

A continuous fiber-reinforced molded resin was obtained in the same manner as Example 3-1, except that the polyamide film was a film of polyamide resin B.

Example 3-5

A continuous fiber-reinforced molded resin was obtained in the same manner as Example 3-1, except that the number of glass cloths was 5, and the number of polyamide resin A films was 10.

Example 3-6

A continuous fiber-reinforced molded resin was obtained in the same manner as Example 3-2, except that the number of glass cloths was 5, and the number of polyamide resin A films was 10.

Comparative Example 3-1

A continuous fiber-reinforced molded resin was obtained in the same manner as Example 3-1, except that glass fibers without addition of a sizing agent were used.

Comparative Example 3-2

A continuous fiber-reinforced molded resin was obtained in the same manner as Example 3-6, except that the glass fibers used were adhered with a sizing agent that was 0.3 mass % of 3-glycidoxypropyltrimethoxysilane as a silane coupling agent, 1.5 mass % of an epoxy resin emulsion and 0.2 mass % of carnauba wax.

Comparative Example 3-3

Evaluation was conducted in the same manner as Example 3-1, for "Tepex Dynalite 101" by Bond Laminate Co. comprising a glass cloth impregnated with polyamide 66.

TABLE 3

| | Maximum storage modulus in twisting mode (GPa) | Storage modulus peak temperature (° C.) | Storage modulus in diagonal direction (GPa) | Storage modulus at 150° C. (GPa) | Shear viscosity (MPa · s$^{-1}$) | Impact strength (kN) | Vf (%) | Leaked resin quantity ratio (%) |
|---|---|---|---|---|---|---|---|---|
| Example 3-1 | 7.4 | 43 | 14.7 | 2.6 | 740 | 9.10 | 65 | 0.1 |
| Example 3-2 | 7.7 | 43 | 15.5 | 2.9 | 770 | 9.25 | 65 | 0.3 |
| Example 3-3 | 6.8 | 42 | 11.2 | 1.7 | 680 | 8.81 | 65 | 0.1 |
| Example 3-4 | 7.2 | 40 | 14.1 | 2.3 | 720 | 9.05 | 65 | 0.1 |
| Example 3-5 | 5.4 | 41 | 10.3 | 1.5 | 540 | 8.50 | 50 | 0.1 |
| Example 3-6 | 5.3 | 42 | 10.3 | 1.4 | 530 | 8.50 | 50 | 0.1 |
| Comparative Example 3-1 | 2.5 | 35 | 3.0 | 0.2 | 250 | 3.20 | 65 | 0.1 |
| Comparative Example 3-2 | 3.1 | 38 | 4.7 | 0.7 | 310 | 5.21 | 50 | 0.1 |
| Comparative Example 3-3 | 3.3 | 38 | 4.7 | 1.2 | 326 | 5.32 | 50 | |

Based on Table 3, the continuous fiber-reinforced molded resins of Examples 3-1 to 3-6 exhibited very high impact strength, because the storage modulus in twisting mode was 3.4 GPa or greater. Their physical properties were much more satisfactory than the physical properties of a molded article obtained using the commercially available intermediate material of Comparative Example 3-3.

When the storage modulus in twisting mode was low, as in the Comparative Examples, the impact strength was reduced.

Example 4-1

Five glass cloths and ten polyamide resin A films were stacked and molded. The temperature in the molding machine was set to 300° C., the molding time was 10 minutes after reaching 265° C. as the melting point of polyamide 66, and after quenching of the die, it was released and the molded article was removed. The maximum temperature during molding was 300° C. The bending storage modulus at this time was 31 GPa, the bending storage modulus at 150° C. was 24 GPa (retention: 77%), the bending storage modulus when cut diagonally was 20 GPa (retention: 64%), the tensile storage modulus at 50° C. was 25 GPa, the tensile loss tangent was 0.033, the temperature of tensile storage modulus and bending storage modulus reversal was 115° C., the value of {(tensile storage modulus−bending storage modulus) at 30° C.}/{(bending storage modulus−tensile storage modulus) at 200° C.} was 2.3, and the impact strength was 8.50 kN.

Example 4-2

Six glass cloths and seven polyamide resin A films were stacked and molded. The temperature in the molding machine was set to 300° C., the molding time was 10 minutes after reaching 265° C. as the melting point of polyamide 66, and after quenching of the die, it was released and the molded article was removed. The maximum temperature during molding was 300° C. The bending storage modulus at this time was 37 GPa, and the impact strength was 9.25 kN.

Example 4-3

A continuous fiber-reinforced molded resin was obtained in the same manner as Example 4-2, except that molding was for 30 seconds after reaching 265° C. The maximum temperature during molding was 280° C. The bending storage modulus at this time was 28 GPa, and the impact strength was 8.81 kN.

Example 4-4

A continuous fiber-reinforced molded resin was obtained in the same manner as Example 4-2, except that the polyamide film was a film of polyamide resin B. The bending storage modulus at this time was 33 GPa, and the impact strength was 9.05 kN.

Example 4-5

A continuous fiber-reinforced molded resin was obtained in the same manner as Example 4-1, except that molding was for 1 minute after reaching 265° C. The maximum temperature during molding was 285° C. The bending storage modulus at this time was 31 GPa, and the impact strength was 8.50 kN.

Example 4-6

Six glass cloths and seven polyamide resin A films were stacked and molded. The molding time was 1 minute after reaching 265° C. as the melting point of polyamide 66, and after quenching of the die, it was released and the molded article was removed. The maximum temperature during molding was 285° C. The bending storage modulus at this time was 36 GPa, and the impact strength was 9.10 kN.

Comparative Example 4-1

A continuous fiber-reinforced molded resin was obtained in the same manner as Example 6, except that glass fibers without addition of a sizing agent were used. The bending storage modulus at this time was 15 GPa, and the impact strength was 3.20 kN.

Comparative Example 4-2

A continuous fiber-reinforced molded resin was obtained in the same manner as Example 4-1, except that the glass fibers used were adhered with a sizing agent that was 0.3 mass % of 3-glycidoxypropyltrimethoxysilane as a silane coupling agent, 1.5 mass % of an epoxy resin emulsion and 0.2 mass % of carnauba wax. The bending storage modulus at this time was 20 GPa, and the impact strength was 5.21 kN.

Comparative Example 4-3

Evaluation was conducted in the same manner as Example 4-1, for "Tepex Dynalite 101" by Bond Laminate Co. comprising a glass cloth impregnated with polyamide 66. The bending storage modulus at this time was 20.8 GPa, the bending storage modulus at 150° C. was 15.7 GPa (retention: 75%), the bending storage modulus when cut diagonally was 11.9 GPa (retention: 57%), the tensile storage modulus at 50° C. was 21 GPa, the tensile loss tangent was 0.038, the temperature of tensile storage modulus and bending storage modulus reversal was 90° C., the value of {(tensile storage modulus−bending storage modulus) at 30° C.}/{(bending storage modulus−tensile storage modulus) at 200° C.} was 0.57, and the impact strength was 5.32 kN.

The continuous fiber-reinforced molded resins of Examples 4-1 to 4-6 exhibited very high impact strength, because the bending storage modulus in twisting mode was 22 GPa or greater. Their physical properties were much more satisfactory than the physical properties of a molded article obtained using the commercially available intermediate material of Comparative Example 4-3.

When the bending storage modulus in twisting mode was low, as in the Comparative Examples, the impact strength was reduced.

Example 5-1

A thermoplastic resin film was produced using a dry blend of PA66 and PA6/12 in a weight ratio of 8:1. The thickness of the film was 100 μm. After alternately laminating 11 films and 10 glass cloths, they were molded. The PA6/12 was evenly dispersed in the PA66 in the resin region other than the interface region with the glass fibers.

Example 5-2

A continuous fiber-reinforced molded resin was produced in the same manner as Example 5-1, except for using PA6 instead of PA6/12. The PA6 was evenly dispersed in the PA66 in the resin region other than the interface region with the glass fibers.

Example 5-3

A continuous fiber-reinforced molded resin was produced in the same manner as Example 5-1, except for using PE instead of PA6/12. The PE was evenly dispersed in the PA66 in the resin region other than the interface region with the glass fibers.

Example 5-4

A continuous fiber-reinforced molded resin was produced in the same manner as Example 5-1, except for using PA6I instead of PA6/12. The PA6I was evenly dispersed in the PA66 in the resin region other than the interface region with the glass fibers.

Example 5-5

A continuous fiber-reinforced molded resin was produced in the same manner as Example 5-1, except that PA66 and PA6/12 were dry blended in a weight ratio of 5:4. The PA6/12 was evenly dispersed in the PA66 in the resin region other than the interface region with the glass fibers.

Example 5-6

A continuous fiber-reinforced molded resin was produced in the same manner as Example 5-1, except that the thermoplastic resin film was produced using a mixture of PA66 and PA6/12 prekneaded with a charging ratio (weight ratio) of 8:1 using a twin-screw extruder (TEM26SS, Toshiba Machine Co., Ltd.). The PA6/12 was evenly dispersed in the PA66 in the resin region other than the interface region with the glass fibers.

Example 5-7

A continuous fiber-reinforced molded resin was produced in the same manner as Example 5-1, except that a carbon fiber fabric was used instead of a glass cloth. The PA6/12 was evenly dispersed in the PA66 in the resin region other than the interface region with the glass fibers.

Comparative Example 5-1

A continuous fiber-reinforced molded resin was produced in the same manner as Example 5-1, except that the film was produced using PA66 alone.

Comparative Example 5-2

A continuous fiber-reinforced molded resin was produced in the same manner as Example 5-1, except for using PA6T/6I instead of PA6/12. The PA6T/6I was evenly dispersed in the PA66 both in the resin region other than the interface region with the glass fibers, and in the interface region.

Comparative Example 5-3

A glass cloth was cut out to 19.5 cm×9.5 cm and immersed in a solution of a polyamide emulsion adjusted to 30 mass % with purified water (SEPOLSION PA200 by Sumitomo Seika Chemicals Co., Ltd.), after which it was dried at 80° C. for 1 hour with a hot air circulation dryer to prepare a composite material. The coverage of the PA6/12 polyamide emulsion solid component on the glass cloth in the obtained composite material was 6 mass %. This was then layered with a PA66 film to produce a continuous fiber-reinforced molded resin in the same manner as Example 5-1. With this Example, the PA6/12 was not evenly dispersed in the PA66, but was present only in the interface region.

Comparative Example 5-4

A continuous fiber-reinforced molded resin was produced in the same manner as Example 5-1, except that PA66 and PA6/12 were dry blended in a weight ratio of 1:8. The PA66 was evenly dispersed in the PA6/12 in the resin region other than the interface region with the glass fibers.

The results for Examples 5-1 to 5-7 and Comparative Examples 5-1 to 5-4 are shown in Table 4.

TABLE 4

| | Example 5-1 | Example 5-2 | Example 5-3 | Example 5-4 | Example 5-5 | Example 5-6 |
|---|---|---|---|---|---|---|
| Occupying ratio of resin in boundary interface region | PA66:PA6/12 = 4:6 | PA66:PA6 = 4:6 | PA66:PE = 4:6 | PA66:PA6I = 4:6 | PA66:PA6/12 = 2:8 | PA66:PA6/12 = 3:7 |
| Occupying ratio of resin in other resin region | 8:1 | 8:1 | 8:1 | 8:1 | 5:4 | 8:1 |
| Melting point difference | 135 | 40 | 140 | 135 | 135 | 135 |
| Tm − Tc | 39 | 31 | 42 | 39 | 40 | 39 |
| Bonding strength | G | G | P | G | G | G |
| Wettability | G | G | P | G | G | G |
| Surface tension | G | G | P | G | G | G |
| Resin melting point | 265 | 265 | 265 | 265 | 250 | 265 |
| Resin melt viscosity | G | G | G | G | P | G |
| Impregnation rate (%) | 99.5 | 99 | 99 | 99.5 | 99.5 | 99.5 |
| Tensile stress | 470 | 450 | 420 | 460 | 410 | 460 |
| Flexural stress | 600 | 580 | 550 | 590 | 550 | 610 |
| Flexural modulus | 25 | 24 | 20 | 22 | 24 | 26 |
| Tensile stress at 150° C. | 400 | 390 | 360 | 380 | 320 | 400 |

| | Example 5-7 | Comparative Example 5-1 | Comparative Example 5-2 | Comparative Example 5-3 | Comparative Example 5-4 |
|---|---|---|---|---|---|
| Occupying ratio of resin in boundary interface region | PA66:PA6/12 = 4:6 | | PA66:PA6T/6I = 8:1 | PA66:PA6/12 = 1:9 | PA66:PA6/12 = 1:9 |
| Occupying ratio of resin in other resin region | 8:1 | | 8:1 | 10:0 | 1:8 |
| Melting poin difference | 135 | | 135 | 135 | 135 |
| Tm − Tc | 39 | 53 | 39 | | 19 |
| Bonding strength | G | | P | G | P |
| Wettability | G | | P | G | P |
| Surface tension | G | | P | G | P |
| Resin melting point | 265 | 265 | 265 | | 130 |
| Resin melt viscosity | G | | G | | G |
| Impregnation rate (%) | 99.5 | 97 | 96 | 99 | 99 |
| Tensile stress | 800 | 380 | 320 | 420 | 420 |
| Flexural stress | 760 | 500 | 400 | 550 | 550 |
| Flexural modulus | 47 | 17 | 12 | 15 | 17 |
| Tensile stress at 150° C. | 681 | 228 | 200 | 230 | 230 |

Judging from Table 4, for the continuous fiber-reinforced molded resin of the embodiments, at the interface between a single continuous reinforcing fiber of two or more types and the thermoplastic resin in a cross-section perpendicular to the lengthwise direction of the continuous reinforcing fiber, in a region of the outer peripheral edge separated from the perimeter of the continuous reinforcing fiber by 1/10 of the radius of a single continuous reinforcing fiber, the proportion of the two or more thermoplastic resins that was occupied by the resin (secondary resin) other than the resin with the highest occupying proportion of the entire resin region (primary resin), was higher than the proportion occupied by the primary resin, as shown by Examples 5-1 to 5-7, but in the resin region other than that region of the outer peripheral edge, each secondary resin other than the resin with the highest occupying proportion of the entire resin region (primary resin), of the two or more thermoplastic resins, was either evenly dispersed or mixed, and therefore high tensile stress, flexural stress, flexural modulus and high-temperature tensile stress were exhibited. As shown by Comparative Example 5-1, on the other hand, the adhesion between the reinforcing fibers and thermoplastic resin was insufficient with only one type of thermoplastic resin, and the tensile stress, flexural stress, flexural modulus and high-temperature tensile stress were reduced. As shown by Comparative Examples 5-2 and 5-4, even with two or more thermoplastic resins, when the occupying ratio of the resin with the highest occupying proportion of the entire resin region (primary resin) among the two or more thermoplastic resins was higher than the occupying ratio of the secondary resin, in the region of the outer peripheral edge separated by 1/10 of the radius of the single continuous reinforcing fiber from the perimeter of the continuous reinforcing fibers of the two or more types, adhesion between the reinforcing fibers and the thermoplastic resin became insufficient, and the tensile stress, flexural stress, flexural modulus and high-temperature tensile stress were reduced. As shown in Comparative Example 3, even though secondary resin was present other than the resin with the highest occupying proportion of the entire resin region (primary resin), of the two or more thermoplastic resins, in the region of the outer peripheral edge separated by 1/10 of the radius of the single continuous reinforcing fiber from the perimeter of the continuous reinforcing fibers of the two or more types, the secondary resin was not evenly dispersed or mixed in the resin region other than that region of the outer peripheral edge, and therefore the high-temperature tensile stress was reduced.

Example 6-1

Figure 3:
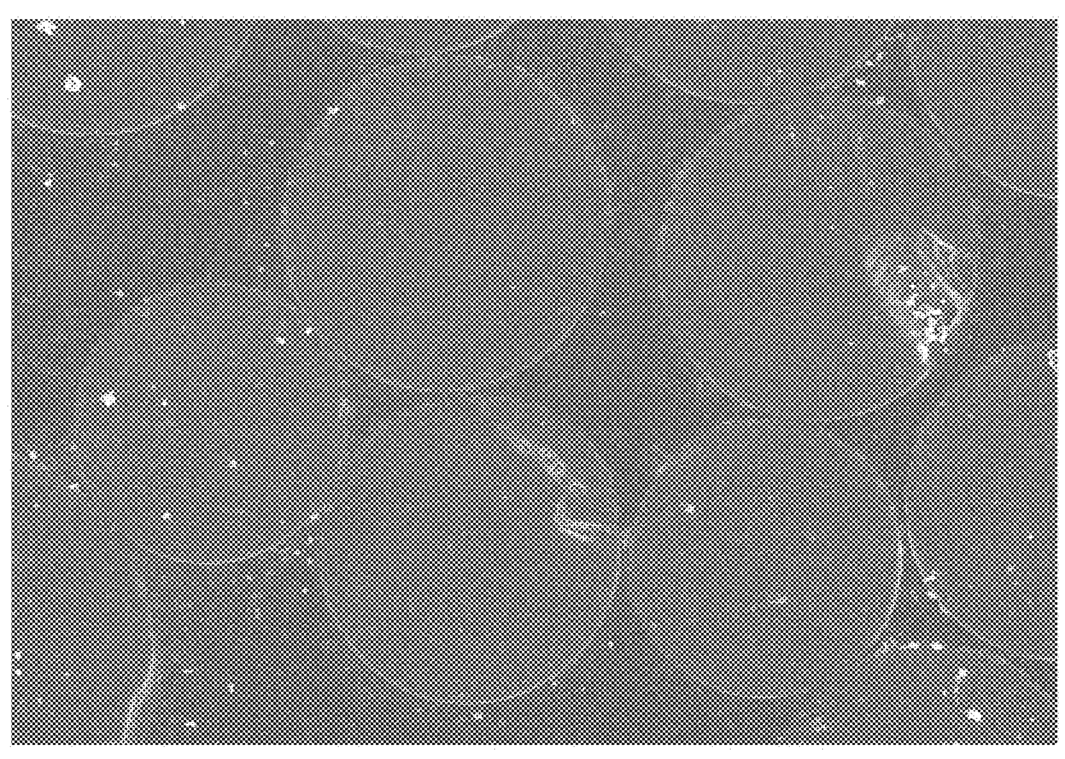
FIG. 3 is a photograph of the interface regions for Example 1-3.

Five glass cloths and 10 polyamide resin films were stacked and molded using a double belt press apparatus. The absorption percentage of the polyamide resin was 0.2 wt %. FIG. 3 shows a photograph of an interface region in the obtained molded article.

Example 6-2

Five glass cloths and ten polyamide resin films were stacked and molded with a die. The molding time was 1 minute after reaching 265° C. as the melting point of polyamide 66, and after quenching of the die, it was released and the molded article was removed. The maximum temperature during molding was 285° C. The absorption percentage of the polyamide resin was 0.2 wt %.

Example 6-3

A continuous fiber-reinforced resin composite material was obtained in the same manner as Example 6-1, except that the polyamide resin film was dried with a vacuum dryer before molding. The absorption percentage of the polyamide resin was 0.01 wt %.

Example 6-4

A continuous fiber-reinforced resin composite material was obtained in the same manner as Example 1, except that during molding with the polyamide film, the polyamide resin and a carbon black master batch were dry blended and molded for use as a polyamide resin film. The absorption percentage of the polyamide resin was 0.2 wt %. The carbon black content was 90 ppm. In the Examples other than Example 6-4 and the Comparative Examples, no carbon black particulate additive was added.

Example 6-5

A continuous fiber-reinforced resin composite material was obtained in the same manner as Example 6-1, except that the polyamide 66 used had an amount of carboxyl terminal groups of 50 μmol/g and an amount of carboxyl terminal groups of 30 μmol/g. The absorption percentage of the polyamide resin was 0.2 wt %.

Example 6-6

A continuous fiber-reinforced resin composite material was obtained in the same manner as Example 6-1, except that the polyamide 66 used had an amount of carboxyl terminal groups of 70 μmol/g and an amount of amino terminal groups of 50 μmol/g. The absorption percentage of the polyamide resin was 0.2 wt %.

Example 6-7

A continuous fiber-reinforced resin composite material was obtained in the same manner as Example 6-1, except that the thermoplastic resin used was obtained by using a biaxial kneader to knead the polyamide 66 with 0.05 wt % sodium hypophosphite as a catalyst to promote reaction between the silane coupling agent and carboxyl terminal groups. The absorption percentage of the polyamide resin was 0.2 wt %.

Example 6-8

A continuous fiber-reinforced resin composite material was obtained in the same manner as Example 6-1, except that 0.05 wt % sodium hypophosphite was added to the sizing agent of the glass fibers. The absorption percentage of the polyamide resin was 0.2 wt %.

Example 6-9

A continuous fiber-reinforced resin composite material was obtained in the same manner as Example 6-2, except that a die open in the longitudinal direction was used as the die. The absorption percentage of the polyamide resin was 0.2 wt %.

Comparative Example 6-1

A continuous fiber-reinforced resin composite material was obtained in the same manner as Example 1, except that glass fibers without addition of a sizing agent were used.

Comparative Example 6-2

Figure 4:
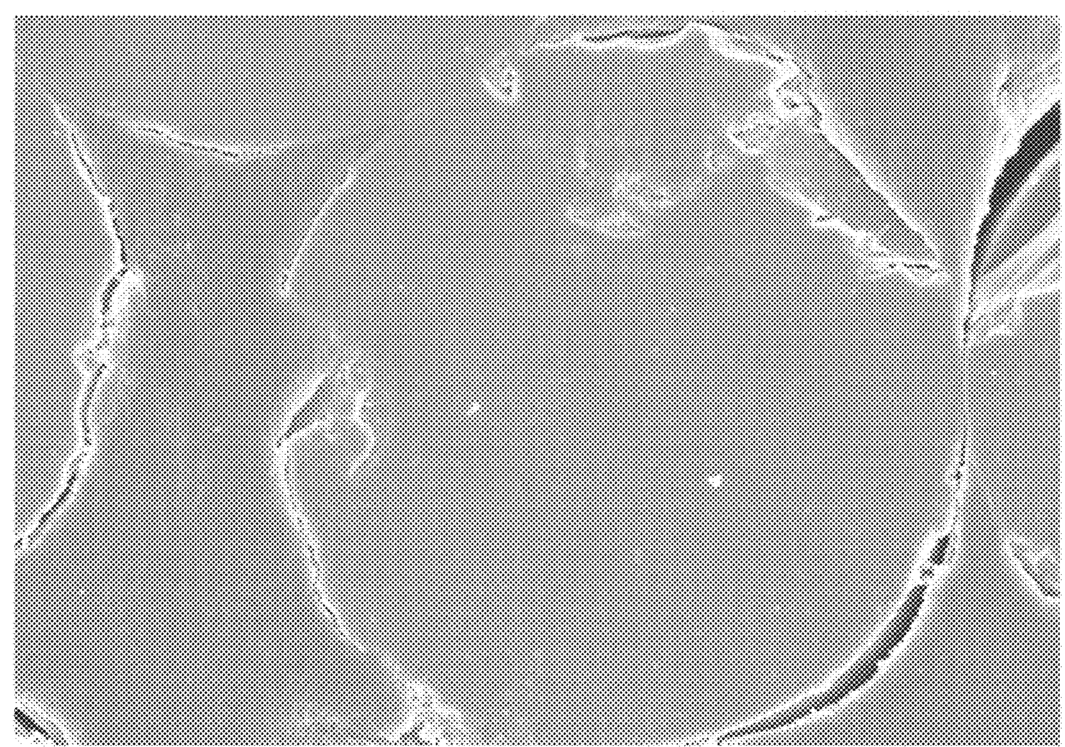
FIG. 4 is a photograph of the interface regions for Comparative Example 1-2.
Figure 5:
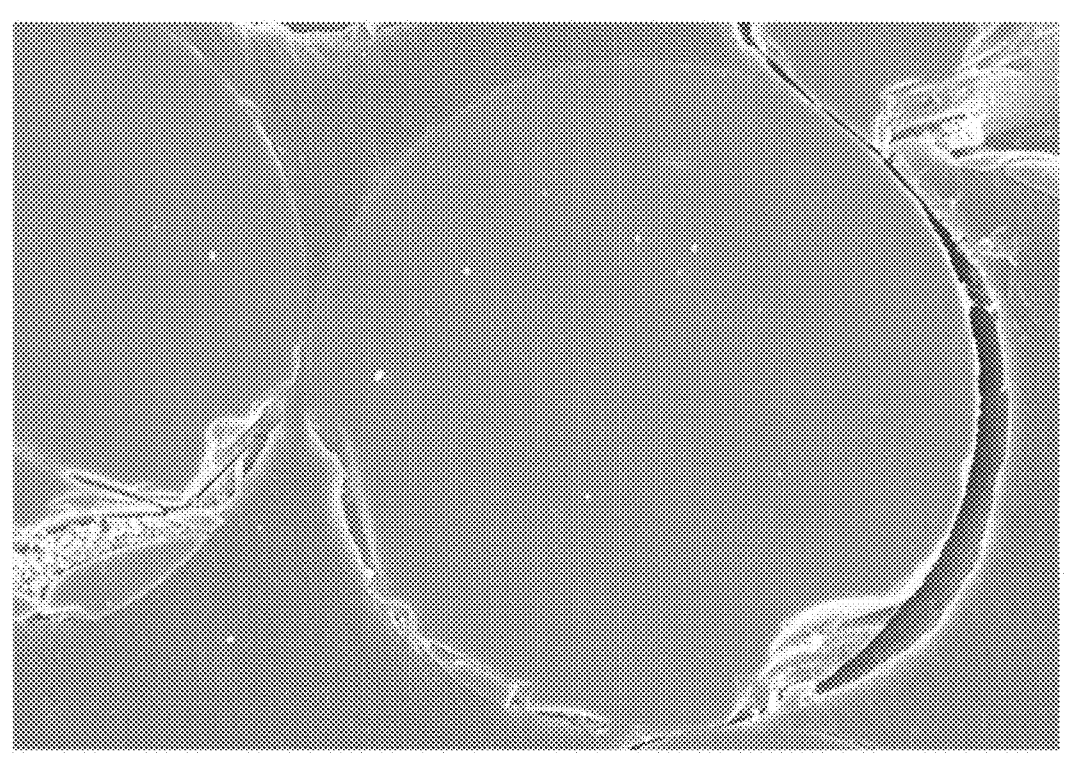
FIG. 5 is a photograph of the interface regions for Comparative Example 1-3.

A continuous fiber-reinforced resin composite material was obtained in the same manner as Example 6-1, except that the glass fibers used were adhered with a sizing agent that was 0.3 mass % of 3-glycidoxypropyltrimethoxysilane as a silane coupling agent, 1.5 mass % of an epoxy resin emulsion and 0.2 mass % of carnauba wax. FIG. 4 shows a photograph of an interface region in the obtained molded article.

TABLE 5

| | Mean void percentage (%) | Proportion with void percentage of 10% or lower | Tensile stress (MPa) | Flexural stress (MPa) | Flexural modulus (GPa) | Impregnation rate (%) | Vf (%) | Flow rate during pressing (%) | Proportion of diffused sizing agent (%) |
|---|---|---|---|---|---|---|---|---|---|
| Example 6-1 | 0.5 | 90 | 580 | 930 | 30 | 100 | 50 | 0.1 | 90 |
| Example 6-2 | 0.5 | 90 | 580 | 930 | 30 | 100 | 50 | 0.1 | 90 |
| Example 6-3 | 3.0 | 85 | 520 | 850 | 27 | 100 | 50 | 0.3 | 80 |
| Example 6-4 | 6.0 | 75 | 490 | 750 | 25 | 100 | 50 | 3 | 80 |
| Example 6-5 | 4.0 | 82 | 530 | 860 | 26 | 100 | 50 | 2 | 60 |
| Example 6-6 | 4.0 | 82 | 530 | 860 | 26 | 100 | 50 | 2 | 60 |
| Example 6-7 | 0.3 | 92 | 590 | 950 | 30 | 100 | 50 | 0.1 | 85 |
| Example 6-8 | 0.3 | 92 | 590 | 950 | 30 | 100 | 50 | 0.1 | 85 |
| Example 6-9 | 6.5 | 80 | 480 | 730 | 25 | 100 | 50 | 13 | 90 |

TABLE 5-continued

| | Mean void percentage (%) | Proportion with void percentage of 10% or lower | Tensile stress (MPa) | Flexural stress (MPa) | Flexural modulus (GPa) | Impregnation rate (%) | Vf (%) | Flow rate during pressing (%) | Proportion of diffused sizing agent (%) |
|---|---|---|---|---|---|---|---|---|---|
| Comparative Example 6-1 | 50 | 2 | 180 | 300 | 12 | 85 | 50 | 0.1 | — |
| Comparative Example 6-2 | 30 | 5 | 350 | 400 | 18 | 90 | 50 | 0.1 | 20 |

Based on Table 5, the continuous fiber-reinforced resin composite materials of Examples 6-1 to 6-9 exhibited very high tensile stress, flexural stress and flexural moduli due to reactivity of the coupling agent with the terminal functional groups in the thermoplastic resin.

When the absorption percentage of the thermoplastic resin was low, as in Example 6-3, a reduction in physical properties was found.

A reduction in physical properties was also found when the particulate additive content was high, as in Example 6-4.

A reduction in physical properties was also found when the carboxyl terminal group content of the polyamide resin was low, as in Example 6-5.

A reduction in physical properties was also found when the amino terminal group content of the polyamide resin was high, as in Example 6-6.

When the flow rate of the thermoplastic resin was high during pressing as in Example 6-9, the coupling agent and the terminal functional groups in the thermoplastic resin failed to thoroughly react, and a reduction in physical properties was found.

In Comparative Example 6-1 which used continuous reinforcing fibers not coated with a sizing agent, and Comparative Example 6-2 which used continuous reinforcing fibers coated with a sizing agent containing a coupling agent with essentially no reactivity with the terminal groups of the resin, the tensile stress, flexural stress and flexural modulus were reduced.

Example 7-1

Five glass cloths using glass fibers A and ten films of polyamide resin A were stacked and press molded with a die. The molding time was 1 minute after reaching 265° C. as the melting point of polyamide 66, and after quenching of the die, it was released and the molded article was removed. The maximum temperature during molding was 285° C. The A/E method was used to measure the breaking strength of the molded article due to interlayer separation.

Example 7-2

A continuous fiber-reinforced resin composite material was obtained in the same manner as Example 7-1, except that glass fibers C were used as the continuous reinforcing fibers.

Example 7-3

A continuous fiber-reinforced resin composite material was obtained in the same manner as Example 7-2, except that molding was carried out with a double belt apparatus.

Comparative Example 7-1

Evaluation was conducted in the same manner as Example 7-1, for "Tepex Dynalite 101" by Bond Laminate Co. comprising a glass cloth impregnated with polyamide 66.

TABLE 6

| | Interlayer separation breaking strength (MPa) | Tensile stress (MPa) | Flexural stress (MPa) | Flexural modulus (GPa) | Shock absorption energy (J) | Shock absorption strength (kN) |
|---|---|---|---|---|---|---|
| Example 7-1 | 49.5 | 580 | 930 | 30 | 24.50 | 8.50 |
| Example 7-2 | 53.2 | 590 | 940 | 30 | 25.50 | 8.70 |
| Example 7-3 | 52.8 | 586 | 936 | 30 | 25.00 | 8.60 |
| Comparative Example 7-1 | 29.3 | 380 | 560 | 23 | 16.08 | 5.32 |

Based on Table 6, the continuous fiber-reinforced resin composite materials of Examples 7-1 to 7-3 had higher breaking strength due to interlayer separation and therefore exhibited much higher tensile stress, flexural stress, flexural moduli and impact strength, compared to Comparative Example 7-1.

Example 8-1

Five glass cloths using glass fibers A and ten films of polyamide resin A were stacked and press molded with a die. The molding time was 1 minute after reaching 265° C. as the melting point of polyamide 66, and after quenching of the die, it was released and the molded article was removed. The maximum temperature during molding was 285° C. The μ-drop formation coefficient between the glass fibers A and polyamide resin A was 25.

Example 8-2

A continuous fiber-reinforced resin composite material was obtained in the same manner as Example 8-1, except that glass fibers C were used. The μ-drop formation coefficient between the glass fibers C and polyamide resin A was 27.

Comparative Example 8-1

A continuous fiber-reinforced resin composite material was obtained in the same manner as Example 8-1, except that a film of polyamide resin C was used as the polyamide resin. The μ-drop formation coefficient between the glass fibers A and polyamide resin C was 3.

Comparative Example 8-2

A continuous fiber-reinforced resin composite material was obtained in the same manner as Comparative Example 8-1, except that glass fibers C were used as the glass fibers. The μ-drop formation coefficient between the glass fibers C and polyamide resin C was 3.

TABLE 7

| | μ-Drop formation coefficient | Tensile stress (MPa) | Flexural stress (MPa) | Flexural modulus (GPa) | Shock absorption energy (J) | Shock absorption strength (kN) | Frequency of breakage in vibration fatigue test at 250 MPa (times) |
|---|---|---|---|---|---|---|---|
| Example 8-1 | 25 | 580 | 930 | 30 | 24.50 | 8.50 | 36,000 |
| Example 8-2 | 27 | 590 | 940 | 30 | 25.50 | 8.70 | 37,000 |
| Comparative Example 8-1 | 3 | 420 | 730 | 20 | 17.76 | 6.11 | 1900 |
| Comparative Example 8-2 | 3 | 420 | 750 | 20 | 17.91 | 6.16 | 2000 |

Based on Table 7, the continuous fiber-reinforced resin composite materials of Examples 8-1 and 8-2 had higher μ-drop formation coefficients, and therefore exhibited much higher tensile stress, flexural stress, flexural moduli, impact strength and long-term properties, compared to Comparative Examples 8-1 and 8-2.

Example 9

Figure 12:
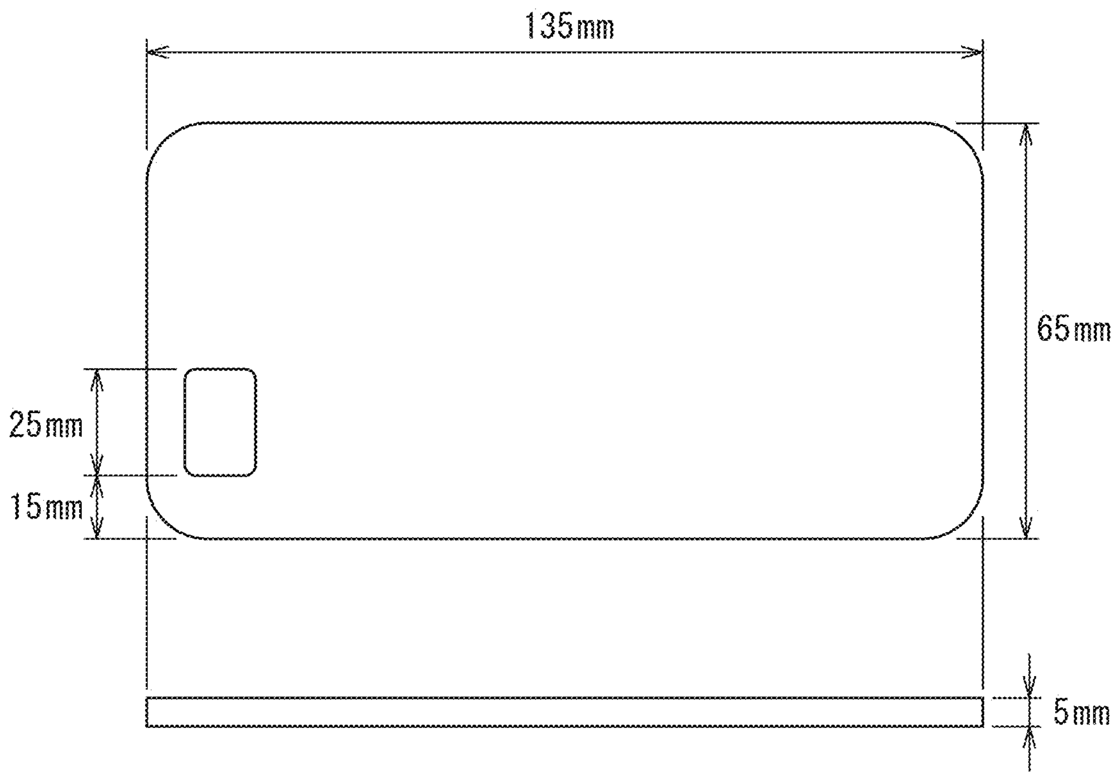
FIG. 12 is a diagram showing the shape of a smartphone housing for Example 9.

A smartphone housing with the shape shown in FIG. 12 was fabricated. One glass cloth using glass fibers C was sandwiched by polyamide resin A films and press molded.

The obtained molded article had a wall thickness of 0.4 mm, dimensions of 135 mm in the lengthwise direction and 65 mm in the widthwise direction, a lateral wall height of 5 mm, a tensile strength of 550 MPa and a flexural modulus of 35 MPa in the lengthwise direction, and a tensile strength of 530 MPa and a flexural modulus of 33 MPa in the widthwise direction. As a result of measuring the electric field shield property at a flat section of the molded article by the KEC method, it was found to have excellent electromagnetic wave transparency at 0 dB in the frequency band of 1 GHz.

The outer appearance of the molded article was satisfactory with no disorder of the fibers.

The tensile strength was measured according to JIS K7161. The flexural modulus was measured according to JIS K7171. The electric field shield property was measured by attaching a molded article cut out to a 5 cm×5 cm square shape onto an aluminum sample-anchoring jig using conductive tape, applying electrolysis using an MA8602C electromagnetic wave shield property tester by Anritsu Co. (KEC method), and measuring the electrolytic shield characteristic at 1 GHz using an MS2661C spectrum analyzer by Anritsu Co.

Example 10

Figure 10:
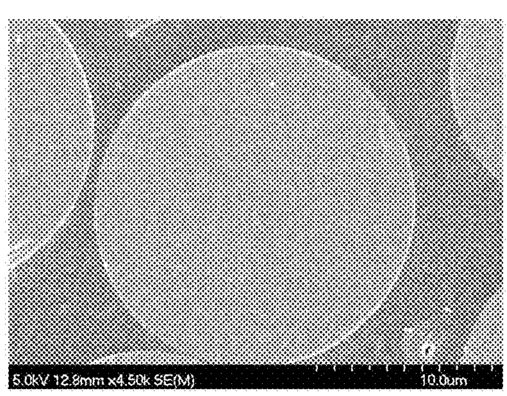
FIG. 10 is a photograph of the interface regions for Example 10.

The glass fibers C chopped to 3 mm were kneaded with polyamide resin A using an HK-25D codirectional rotating twin-screw kneading extruder (41D) Φ25 mm, L/D=41 (product of Parker Corp.) and a metering unit (K-CL-24-KT20 weight-loaded twin-screw feeder by K-Tron Co.), at a screw rotation speed of 175 rpm and a supply rate of 5 kg/h, to obtain pellets. The pellets were used to prepare a type A1, t4 mm molded multipurpose test piece conforming to JIS K 7139, using an electric injection molding machine (NEX140 by Nissei Plastic Industrial Co., Ltd., 140 tf mold clamping force/Φ40 screw diameter/full flight screw), under conditions according to JIS K 7152-1. FIG. 10 shows an observational photograph of the interface taken during the preparation.

Comparative Example 10

Figure 11:
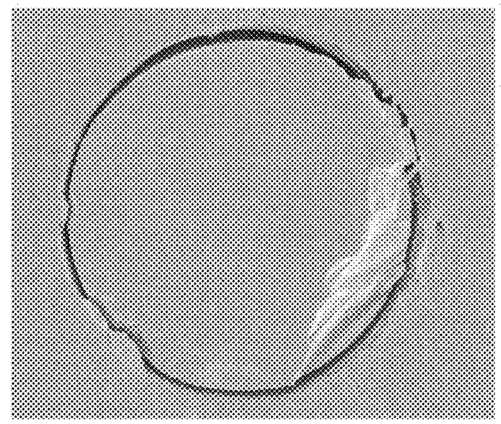
FIG. 11 is a photograph of the interface regions for Comparative Example 10.

A molded article was fabricated in the same manner as Example 10, except for using polyamide resin C as the polyamide resin. FIG. 11 shows an observational photograph of the interface taken during the preparation.

As shown in FIGS. 10 and 11, a satisfactory interface can be formed when the μ-drop formation coefficient is 10 or greater and compatibility between the glass fibers and resin is satisfactory.

INDUSTRIAL APPLICABILITY

The continuous fiber-reinforced molded resin of the embodiment is industrially useful as a reinforcing material for materials that require a high level of mechanical properties, such as structural parts for various machines and vehicles, and also as a composite molded article material in thermoplastic resin compositions. With the method for producing the continuous fiber-reinforced resin composite material of the invention it is possible to obtain a continuous fiber-reinforced resin composite material that has high adhesive force and affinity at the interfaces between the continuous reinforcing fibers and thermoplastic resin and low voids in the interfaces, and that exhibits sufficient strength.

REFERENCE SIGNS LIST r Radius of continuous reinforcing fiber based on approximately circular cross-section

1 Synthetic resin

2 Continuous reinforcing fiber

3 Void

4 Continuous reinforcing fiber bundle

5 Region of outer peripheral edge separated from the perimeter of a continuous reinforcing fiber by 1/10 of the radius of the single continuous reinforcing fiber, at the interface between the single continuous reinforcing fiber and a thermoplastic resin, in a cross-section perpendicular to the lengthwise direction of the continuous reinforcing fiber.

6 Continuous reinforcing fiber

7 Resin (secondary resin) other than resin with the highest occupying proportion of the entire resin region (primary resin) of two or more thermoplastic resins

8 Resin with the highest occupying proportion of the entire resin region (primary resin) of two or more thermoplastic resins

The invention claimed is:

1. A method for producing a continuous fiber-reinforced molded resin comprising a continuous fiber-reinforced molded resin comprising continuous reinforcing glass fibers with approximately circular cross-sections and a synthetic resin, wherein at an interface between each continuous reinforcing glass fiber and the synthetic resin in a cross-section perpendicular to a lengthwise direction of the continuous reinforcing fiber, at least 90% or higher of the continuous reinforcing glass fibers are present with a void percentage of 10% or lower at the interface between a continuous reinforcing glass fiber and the synthetic resin in a cross-section perpendicular to a lengthwise direction of the continuous reinforcing glass fiber, wherein the void percentage is determined by the following formula: Void percentage (%)=(area of voids in region of outer peripheral edge separated from perimeter of continuous reinforcing fiber by 1/10 of radius of continuous reinforcing fiber)/(area of region of outer peripheral edge separated from perimeter of continuous reinforcing fiber by 1/10 of radius of continuous reinforcing fiber)×100, after rotating a lengthwise-perpendicular cross-section of a continuous reinforcing fiber of the continuous fiber-reinforced molded resin cut to 1 cm-square with a band saw, on a polishing table rotating at 100 rpm, with a force of 400 g/cm$^2$ applied to the polishing surface, polishing it at approximately 7 mL/min in the order: 10 minutes with #220 waterproof paper, 2 minutes with #400 waterproof paper, 5 minutes with #800 waterproof paper, 10 minutes with #1200 waterproof paper, 15 minutes with #2000 waterproof paper, 15 minutes with 9 μm silicon carbide film particles, 15 minutes with 5 μm alumina film particles, 15 minutes with 3 μm alumina film particles, 15 minutes with 1 μm alumina film particles and 10 minutes with 0.1 μm colloidal silica particles with buffing paper foamed polyurethane, while adding water, observing the polished sample with a scanning electron microscope (SEM) and performing image analysis, the method comprising:

a step of hot pressing reinforcing fibers that have addition of a sizing agent comprising a coupling agent, binding agent and lubricating agent, with a thermoplastic resin that has a terminal functional groups that are reactive with the coupling agent and has a μ-drop formation coefficient with the reinforcing fibers of 10 or greater, at above the melting point of the thermoplastic resin, wherein a flow rate of the thermoplastic resin during the hot pressing is 10% or lower, and a step of cooling to below the melting point of the thermoplastic resin to obtain a continuous fiber-reinforced molded resin, wherein the flow rate of the thermoplastic resin during hot pressing is determined as (weight of thermoplastic resin burrs produced during hot pressing)/(weight of thermoplastic resin before hot pressing), wherein the hot pressing is carried out by either a molding method allowing a die interior to be sealed during molding, including using an inlay die, or a molding method using a double belt press with adjustable pressure, whereby leakage of the resin is prevented and variation in the volume of the continuous fiber-reinforced molded resin occupied by the glass fibers before and after molding is reduced, and wherein the μ-drop formation coefficient is measured using a composite material boundary interface property evaluator, with the resin set in the heating furnace unit and the furnace temperature set to 40° C. below the melting point of the resin, the resin is adhered to each of the individual reinforcing fibers set in the evaluator, and when the resin is unmelted and cannot adhere onto the reinforcing fiber, the furnace temperature is increased 10° C. at a time until the resin melts to adhere the resin onto the reinforcing fiber, and the resin fused onto the reinforcing fiber is touched 4 times to adhere the resin and then allowed to stand for 1 minute, the number of μ-drops generated is counted, and calculation is performed using the following formula: μ-drop formation coefficient={number of μ-drops generated/4}×10.

* * * * *